US011409765B2

(12) United States Patent
Gokhale et al.

(10) Patent No.: US 11,409,765 B2
(45) Date of Patent: *Aug. 9, 2022

(54) APPLICATION OF INFORMATION MANAGEMENT POLICIES BASED ON OPERATION WITH A GEOGRAPHIC ENTITY

(71) Applicant: Commvault Systems, Inc., Tinton Falls, NJ (US)

(72) Inventors: Parag Gokhale, Marlboro, NJ (US); Anand Vibhor, Manalapan, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/903,140

(22) Filed: Jun. 16, 2020

(65) Prior Publication Data
US 2020/0311103 A1    Oct. 1, 2020

Related U.S. Application Data

(63) Continuation of application No. 15/470,689, filed on Mar. 27, 2017, now Pat. No. 10,831,778, which is a
(Continued)

(51) Int. Cl.
*G06F 16/20* (2019.01)
*G06F 16/27* (2019.01)
(Continued)

(52) U.S. Cl.
CPC .......... *G06F 16/27* (2019.01); *G06F 11/1448* (2013.01); *G06F 16/125* (2019.01);
(Continued)

(58) Field of Classification Search
CPC ........ G06F 16/27; G06F 16/125; G06F 21/62; G06F 21/6218; G06F 2201/81; G06F 2201/84; G06F 2221/2111
See application file for complete search history.

(56) References Cited

U.S. PATENT DOCUMENTS 4,394,732 A    7/1983    Swenson
4,464,122 A    8/1984    Fuller et al.
(Continued)

FOREIGN PATENT DOCUMENTS

EP    0259912    3/1988
EP    0405926    1/1991
(Continued)

OTHER PUBLICATIONS

US 10,430,280 B2, 10/2019, Vijayan (withdrawn)
(Continued)

*Primary Examiner* — Tarek Chbouki
(74) *Attorney, Agent, or Firm* — Commvault Systems, Inc.

(57) ABSTRACT

Techniques for providing data retention services based on a geographic region are disclosed. In one aspect, a location of a computing device is determined. A geographic entity corresponding to the location of the computing device is then determined. A data retention policy is applied to data of the computing device based on regulations of the geographic entity. Other aspects are also disclosed.

21 Claims, 10 Drawing Sheets

Related U.S. Application Data continuation of application No. 13/728,386, filed on Dec. 27, 2012, now Pat. No. 9,633,216.

(51) Int. Cl.
    *G06F 21/62* (2013.01)
    *G06F 16/11* (2019.01)
    *G06F 11/14* (2006.01)

(52) U.S. Cl.
    CPC .......... *G06F 21/62* (2013.01); *G06F 21/6218* (2013.01); *G06F 2201/81* (2013.01); *G06F 2201/84* (2013.01); *G06F 2221/2111* (2013.01)

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,386,545 A | 1/1995 | Gombos |
| 5,410,700 A | 4/1995 | Fecteau et al. |
| 5,448,718 A | 9/1995 | Cohn |
| 5,448,724 A | 9/1995 | Hayashi et al. |
| 5,450,592 A | 9/1995 | McLeod |
| 5,485,606 A | 1/1996 | Midgley |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai |
| 5,544,345 A | 8/1996 | Carpenter et al. |
| 5,544,347 A | 8/1996 | Yanai et al. |
| 5,555,371 A | 9/1996 | Duyanovish |
| 5,559,957 A | 9/1996 | Balk |
| 5,564,037 A | 10/1996 | Lam |
| 5,608,865 A | 3/1997 | Midgely |
| 5,613,134 A | 3/1997 | Lucus |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey |
| 5,666,501 A | 9/1997 | Jones |
| 5,673,381 A | 9/1997 | Huai et al. |
| 5,673,382 A | 9/1997 | Cannon |
| 5,699,361 A | 12/1997 | Ding et al. |
| 5,711,010 A | 1/1998 | Naddell |
| 5,729,743 A | 3/1998 | Squibb |
| 5,740,405 A | 4/1998 | DeGraff |
| 5,751,997 A | 5/1998 | Kullick et al. |
| 5,758,359 A | 5/1998 | Saxon |
| 5,758,649 A | 6/1998 | Iwashita |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees |
| 5,872,905 A | 2/1999 | Ono |
| 5,875,478 A | 2/1999 | Blumenau |
| 5,887,134 A | 3/1999 | Ebrahim |
| 5,894,585 A | 4/1999 | Inoue |
| 5,896,531 A | 4/1999 | Curtis |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,009,275 A | 12/1999 | Dekoning |
| 6,012,053 A | 1/2000 | Pant |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough |
| 6,073,128 A | 6/2000 | Pongracz |
| 6,076,148 A | 6/2000 | Kedem et al. |
| 6,091,518 A | 7/2000 | Anabuki |
| 6,094,416 A | 7/2000 | Ying |
| 6,112,304 A | 8/2000 | Clawson |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis |
| 6,212,512 B1 | 4/2001 | Barney et al. |
| 6,226,759 B1 | 5/2001 | Miller |
| 6,239,800 B1 | 5/2001 | Mayhew |
| 6,253,217 B1 | 6/2001 | Dourish |
| 6,260,069 B1 | 7/2001 | Anglin |
| 6,266,679 B1 | 7/2001 | Szalwinski |
| 6,266,784 B1 | 7/2001 | Hsiao |
| 6,269,431 B1 | 7/2001 | Dunham |
| 6,275,953 B1 | 8/2001 | Vahalia et al. |
| 6,298,439 B1 | 10/2001 | Beglin |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii |
| 6,327,612 B1 | 12/2001 | Watanabe |
| 6,328,766 B1 | 12/2001 | Long |
| 6,330,570 B1 | 12/2001 | Crighton et al. |
| 6,330,642 B1 | 12/2001 | Carteau |
| 6,341,287 B1 | 1/2002 | Sziklai et al. |
| 6,343,287 B1 | 1/2002 | Kumar |
| 6,343,324 B1 | 1/2002 | Hubis et al. |
| 6,345,288 B1 | 2/2002 | Reed |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu |
| 6,389,432 B1 | 5/2002 | Pothapragada et al. |
| 6,418,478 B1 | 7/2002 | Ignatius |
| 6,421,678 B2 | 7/2002 | Smiga et al. |
| 6,421,711 B1 | 7/2002 | Blumenau et al. |
| 6,442,706 B1 | 8/2002 | Wahl |
| 6,470,332 B1 | 10/2002 | Weschler |
| 6,484,162 B1 | 11/2002 | Edlund |
| 6,487,561 B1 | 11/2002 | Ofek et al. |
| 6,487,644 B1 | 11/2002 | Huebsch |
| 6,502,205 B1 | 12/2002 | Yanai |
| 6,519,679 B2 | 2/2003 | Devireddy et al. |
| 6,538,669 B1 | 3/2003 | Lagueux, Jr. et al. |
| 6,539,388 B1 | 3/2003 | Hattori |
| 6,540,623 B2 | 4/2003 | Jackson |
| 6,549,918 B1 | 4/2003 | Probert |
| 6,557,039 B1 | 4/2003 | Leong |
| 6,564,228 B1 | 5/2003 | O'Connor |
| 6,593,656 B2 | 7/2003 | Ahn et al. |
| 6,618,771 B1 | 9/2003 | Leja |
| 6,629,110 B2 | 9/2003 | Cane |
| 6,647,399 B2 | 11/2003 | Zaremba |
| 6,658,526 B2 | 12/2003 | Nguyen et al. |
| 6,662,218 B2 | 12/2003 | Mighdoll et al. |

(56) References Cited

U.S. PATENT DOCUMENTS

| | | |
|---|---|---|
| 6,675,177 B1 | 1/2004 | Webb |
| 6,675,299 B2 | 1/2004 | Porter et al. |
| 6,691,232 B1 | 2/2004 | Wood et al. |
| 6,721,767 B2 | 4/2004 | De Meno |
| 6,732,088 B1 | 5/2004 | Glance |
| 6,732,231 B1 | 5/2004 | Don |
| 6,732,244 B2 | 5/2004 | Ashton |
| 6,745,178 B1 | 6/2004 | Emens |
| 6,795,828 B2 | 9/2004 | Ricketts |
| 6,816,941 B1 | 11/2004 | Carlson |
| 6,820,070 B2 | 11/2004 | Goldman |
| 6,839,741 B1 | 1/2005 | Tsai |
| 6,839,803 B1 | 1/2005 | Loh |
| 6,850,994 B2 | 2/2005 | Gabryljeski |
| 6,860,422 B2 | 3/2005 | Hull et al. |
| 6,865,568 B2 | 3/2005 | Chau |
| 6,871,182 B1 | 3/2005 | Winnard |
| 6,892,221 B2 | 5/2005 | Ricart |
| 6,898,650 B1 | 5/2005 | Gao |
| 6,938,039 B1 | 8/2005 | Bober et al. |
| 6,948,038 B2 | 9/2005 | Berkowitz |
| 6,948,039 B2 | 9/2005 | Biessener et al. |
| 6,957,186 B1 | 10/2005 | Guheen |
| 6,970,997 B2 | 11/2005 | Shibayama et al. |
| 6,976,039 B2 | 12/2005 | Chefalas |
| 6,995,675 B2 | 2/2006 | Curkendall |
| 6,996,616 B1 | 2/2006 | Leighton |
| 7,003,641 B2 | 2/2006 | Prahlad |
| 7,028,079 B2 | 4/2006 | Mastrianni |
| 7,035,880 B1 | 4/2006 | Crescenti |
| 7,039,860 B1 | 5/2006 | Gautestad |
| 7,054,960 B1 | 5/2006 | Bezbaruah |
| 7,058,014 B2 | 6/2006 | Sim |
| 7,058,661 B2 | 6/2006 | Ciaramitaro |
| 7,099,901 B2 | 8/2006 | Sutoh |
| 7,107,298 B2 | 9/2006 | Prahlad |
| 7,107,416 B2 | 9/2006 | Stuart et al. |
| 7,133,870 B1 | 11/2006 | Tripp et al. |
| 7,139,826 B2 | 11/2006 | Watanabe |
| 7,139,846 B2 | 11/2006 | Rossi |
| 7,146,387 B1 | 12/2006 | Russo |
| 7,155,421 B1 | 12/2006 | Haldar |
| 7,155,481 B2 | 12/2006 | Prahlad |
| 7,159,081 B2 | 1/2007 | Suzuki |
| 7,171,468 B2 | 1/2007 | Yeung |
| 7,171,585 B2 | 1/2007 | Gail |
| 7,185,152 B2 | 2/2007 | Takahashi et al. |
| 7,188,141 B2 | 3/2007 | Novaes |
| 7,240,100 B1 | 7/2007 | Wein |
| 7,246,207 B2 | 7/2007 | Kotttomtharayil |
| 7,269,664 B2 | 9/2007 | Hutsch |
| 7,284,033 B2 | 10/2007 | Jhanji |
| 7,284,104 B1 | 10/2007 | Wu et al. |
| 7,287,047 B2 | 10/2007 | Kavuri |
| 7,290,017 B1 | 10/2007 | Wang |
| 7,313,659 B2 | 12/2007 | Suzuki |
| 7,315,923 B2 | 1/2008 | Retnamma |
| 7,328,325 B1 | 2/2008 | Solis et al. |
| 7,340,640 B1 | 3/2008 | Karr |
| 7,343,453 B2 | 3/2008 | Prahlad |
| 7,346,623 B2 | 3/2008 | Prahlad |
| 7,346,676 B1 | 3/2008 | Swildens |
| 7,346,751 B2 | 3/2008 | Prahlad |
| 7,376,947 B2 | 5/2008 | Evers |
| 7,379,978 B2 | 5/2008 | Anderson |
| 7,383,379 B2 | 6/2008 | Patterson et al. |
| 7,386,535 B1 | 6/2008 | Kalucha |
| 7,395,282 B1 | 7/2008 | Crescenti |
| 7,421,460 B2 | 9/2008 | Chigusa et al. |
| 7,424,543 B2 | 9/2008 | Rice |
| 7,434,219 B2 | 10/2008 | DeMeno |
| 7,457,790 B2 | 11/2008 | Kochunni |
| 7,472,142 B2 | 12/2008 | Prahlad |
| 7,496,841 B2 | 2/2009 | Hadfield |
| 7,529,782 B2 | 5/2009 | Prahlad |
| 7,536,291 B1 | 5/2009 | Vijayan |
| 7,543,125 B2 | 6/2009 | Parag Gokhale |
| 7,565,484 B2 | 7/2009 | Ghosal |
| 7,577,689 B1 | 8/2009 | Mastiner et al. |
| 7,577,694 B2 | 8/2009 | Nakano |
| 7,581,077 B2 | 8/2009 | Ignatius |
| 7,584,469 B2 | 9/2009 | Mitekura |
| 7,587,715 B1 | 9/2009 | Barrett |
| 7,593,935 B2 | 9/2009 | Sullivan |
| 7,596,713 B2 | 9/2009 | Mani-Meitav et al. |
| 7,603,626 B2 | 10/2009 | Williams |
| 7,606,844 B2 | 10/2009 | Kottomtharayil |
| 7,610,285 B1 | 10/2009 | Zoellner et al. |
| 7,617,262 B2 | 11/2009 | Prahlad |
| 7,656,849 B1 | 2/2010 | Evans |
| 7,668,884 B2 | 2/2010 | Prahlad |
| 7,673,175 B2 | 3/2010 | Mora et al. |
| 7,676,542 B2 | 3/2010 | Moser |
| 7,689,899 B2 | 3/2010 | Leymaster |
| 7,698,520 B2 | 4/2010 | Minami et al. |
| 7,730,031 B2 | 6/2010 | Forster |
| 7,734,593 B2 | 6/2010 | Prahlad |
| 7,734,669 B2 | 6/2010 | Kottomtharayil |
| 7,747,579 B2 | 6/2010 | Prahlad |
| 7,751,628 B1 | 7/2010 | Reisman |
| 7,761,409 B2 | 7/2010 | Stefik et al. |
| 7,792,789 B2 | 9/2010 | Prahlad |
| 7,801,871 B2 | 9/2010 | Gosnell |
| 7,814,118 B2 | 10/2010 | Kottomtharayil |
| 7,827,266 B2 | 11/2010 | Gupta |
| 7,831,793 B2 | 11/2010 | Chakravarty et al. |
| 7,840,537 B2 | 11/2010 | Gokhale |
| 7,844,676 B2 | 11/2010 | Prahlad |
| 7,865,517 B2 | 1/2011 | Prahlad |
| 7,865,938 B2 | 1/2011 | Shahbazi |
| 7,882,077 B2 | 2/2011 | Gokhale |
| 7,882,093 B2 | 2/2011 | Kotttomtharayil |
| 7,882,097 B1 | 2/2011 | Ogilvie |
| 7,937,393 B2 | 5/2011 | Prahlad |
| 7,937,420 B2 | 5/2011 | Tabellion |
| 7,937,702 B2 | 5/2011 | De Meno |
| 7,984,063 B2 | 7/2011 | Kottomtharayil |
| 7,984,435 B2 | 7/2011 | Kokkinen |
| 8,037,028 B2 | 10/2011 | Prahlad |
| 8,055,627 B2 | 11/2011 | Prahlad |
| 8,060,514 B2 | 11/2011 | Arrrouye et al. |
| 8,069,218 B1 | 11/2011 | Tormasov |
| 8,078,607 B2 | 12/2011 | Oztekin et al. |
| 8,099,428 B2 | 1/2012 | Kottomtharayil |
| 8,108,427 B2 | 1/2012 | Prahlad |
| 8,117,173 B2 | 2/2012 | Gurevich |
| 8,126,854 B1 | 2/2012 | Sreedharan |
| 8,131,784 B1 | 3/2012 | Zhuge |
| 8,140,786 B2 | 3/2012 | Bunte |
| 8,145,742 B1 | 3/2012 | Parker |
| 8,156,086 B2 | 4/2012 | Lu |
| 8,161,003 B2 | 4/2012 | Kavuri |
| 8,170,995 B2 | 5/2012 | Prahlad |
| 8,200,637 B1 | 6/2012 | Stringham |
| 8,200,638 B1 | 6/2012 | Zheng |
| 8,219,524 B2 | 7/2012 | Gokhale |
| 8,229,954 B2 | 7/2012 | Prahlad |
| 8,230,054 B2 | 7/2012 | Mutnuru et al. |
| 8,230,195 B2 | 7/2012 | Amarendran |
| RE43,678 E | 9/2012 | Major et al. |
| 8,285,681 B2 | 10/2012 | Prahlad et al. |
| 8,307,177 B2 | 11/2012 | Prahlad |
| 8,347,088 B2 | 1/2013 | Moore et al. |
| 8,352,954 B2 | 1/2013 | Gokhale |
| 8,356,209 B2 | 1/2013 | Gunabalasubramanian et al. |
| 8,356,247 B2 | 1/2013 | Krassner et al. |
| 8,364,652 B2 | 1/2013 | Vijayan |
| 8,370,166 B2 | 2/2013 | Ronnewinkel |
| 8,396,838 B2 | 3/2013 | De Meno |
| 8,463,989 B2 | 6/2013 | Kumagai |
| 8,468,538 B2 | 6/2013 | Attarde et al. |
| 8,473,585 B1 | 6/2013 | Smith et al. |
| 8,477,618 B2 | 7/2013 | Martin |
| 8,484,257 B2 | 7/2013 | Borthakur et al. |

(56) References Cited

U.S. PATENT DOCUMENTS

| | | |
|---|---|---|
| 8,489,760 B2 | 7/2013 | Visharam et al. |
| 8,495,331 B2 | 7/2013 | Matsumoto |
| 8,505,010 B2 | 8/2013 | De Meno |
| 8,510,573 B2 | 8/2013 | Muller |
| 8,578,120 B2 | 11/2013 | Attarde et al. |
| 8,612,394 B2 | 12/2013 | Prahlad |
| 8,655,850 B2 | 2/2014 | Ngo et al. |
| 8,706,867 B2 | 4/2014 | Vijayan |
| 8,707,070 B2 | 4/2014 | Muller |
| 8,719,809 B2 | 5/2014 | Gohkale |
| 8,725,688 B2 | 5/2014 | Lad |
| 8,769,048 B2 | 7/2014 | Kottomtharayil |
| 8,775,823 B2 | 7/2014 | Gokhale |
| 8,782,064 B2 | 7/2014 | Kottomtharayil |
| 8,826,284 B1 | 9/2014 | Fuller |
| 8,832,706 B2 | 9/2014 | Gokhale et al. |
| 8,849,762 B2 | 9/2014 | Kumarasamy |
| 8,959,299 B2 | 2/2015 | Ngo et al. |
| 8,966,288 B2 | 2/2015 | Ignatius |
| 9,092,378 B2 | 7/2015 | Kumarasamy |
| 9,122,692 B1 | 9/2015 | Dalal |
| 9,128,742 B1 | 9/2015 | Akolkar et al. |
| 9,128,883 B2 | 9/2015 | Gokhale |
| 9,262,226 B2 | 2/2016 | Gokhale et al. |
| 9,274,803 B2 | 3/2016 | De Meno et al. |
| 9,348,827 B1 | 5/2016 | Patwardhan |
| 9,411,821 B1 | 8/2016 | Patwardhan |
| 9,444,726 B2 | 9/2016 | Baldwin |
| 9,444,811 B2 | 9/2016 | Nara |
| 9,459,968 B2 | 10/2016 | Vijayan |
| 9,633,216 B2 | 4/2017 | Gokhale |
| 9,639,400 B2 | 5/2017 | Gokhale et al. |
| 9,645,762 B2 | 5/2017 | Nara |
| 9,648,100 B2 | 5/2017 | Klose et al. |
| 9,740,574 B2 | 8/2017 | Kochunni et al. |
| 9,766,825 B2 | 9/2017 | Bhagi |
| 10,157,184 B2 | 12/2018 | Yongtao et al. |
| 10,310,950 B2 | 6/2019 | Kochunni et al. |
| 10,831,778 B2 | 11/2020 | Gokhale et al. |
| 2001/0012986 A1 | 8/2001 | Conan |
| 2001/0028363 A1 | 10/2001 | Nomoto |
| 2001/0052058 A1 | 12/2001 | Ohran |
| 2002/0032878 A1 | 3/2002 | Karpf |
| 2002/0049883 A1 | 4/2002 | Schneider |
| 2002/0120858 A1 | 8/2002 | Porter et al. |
| 2003/0028592 A1 | 2/2003 | Ooho |
| 2003/0046313 A1 | 3/2003 | Leung et al. |
| 2003/0046396 A1 | 3/2003 | Richter |
| 2003/0050979 A1 | 3/2003 | Takahashi |
| 2003/0065897 A1 | 4/2003 | Sadowsky |
| 2003/0095500 A1 | 5/2003 | Cao |
| 2003/0101086 A1 | 5/2003 | San Miguel |
| 2004/0039689 A1 | 2/2004 | Penney et al. |
| 2004/0068713 A1 | 4/2004 | Yannakoyorgos |
| 2004/0098383 A1 | 5/2004 | Tabellion |
| 2004/0098423 A1 | 5/2004 | Chigusa et al. |
| 2004/0220980 A1 | 11/2004 | Forster |
| 2004/0267815 A1 | 12/2004 | De Mes |
| 2005/0039069 A1 | 2/2005 | Prahlad |
| 2005/0076087 A1 | 4/2005 | Budd |
| 2005/0091346 A1 | 4/2005 | Krishnaswami et al. |
| 2005/0097070 A1 | 5/2005 | Enis |
| 2005/0114595 A1 | 5/2005 | Karr et al. |
| 2005/0149949 A1 | 7/2005 | Tipton et al. |
| 2005/0216788 A1 | 9/2005 | Mani-Meitav |
| 2005/0246510 A1 | 11/2005 | Retnamma |
| 2005/0251786 A1 | 11/2005 | Citron |
| 2005/0278207 A1 | 12/2005 | Ronnewinkel |
| 2006/0010286 A1 | 1/2006 | Topham et al. |
| 2006/0036619 A1 | 2/2006 | Fuerst |
| 2006/0070061 A1 | 3/2006 | Cox |
| 2006/0080370 A1 | 4/2006 | Torii |
| 2006/0110286 A1 | 5/2006 | Boukas |
| 2006/0115802 A1 | 6/2006 | Reynolds |
| 2006/0116999 A1 | 6/2006 | Dettinger |
| 2006/0149604 A1 | 7/2006 | Miller |
| 2006/0149724 A1 | 7/2006 | Ritter |
| 2006/0177114 A1 | 8/2006 | Tongdee et al. |
| 2006/0195678 A1 | 8/2006 | Jalobeanu |
| 2006/0195838 A1 | 8/2006 | Epstein |
| 2006/0224846 A1 | 10/2006 | Amarendran |
| 2006/0224852 A1 | 10/2006 | Kottomtharayil |
| 2006/0265396 A1 | 11/2006 | Raman et al. |
| 2006/0271935 A1 | 11/2006 | Cox |
| 2006/0282900 A1 | 12/2006 | Johnson et al. |
| 2007/0014347 A1 | 1/2007 | Prechtl |
| 2007/0016750 A1 | 1/2007 | Suzuki |
| 2007/0022122 A1 | 1/2007 | Bahar |
| 2007/0022145 A1 | 1/2007 | Kavuri |
| 2007/0028229 A1 | 2/2007 | Knatcher |
| 2007/0043715 A1 | 2/2007 | Kaushik |
| 2007/0061266 A1 | 3/2007 | Moore et al. |
| 2007/0061298 A1 | 3/2007 | Wilson et al. |
| 2007/0067595 A1 | 3/2007 | Ghose |
| 2007/0128899 A1 | 6/2007 | Mayer |
| 2007/0136541 A1 | 6/2007 | Herz et al. |
| 2007/0143497 A1 | 6/2007 | Kottomtharayil |
| 2007/0143756 A1 | 6/2007 | Gokhale |
| 2007/0156783 A1 | 7/2007 | Zbogar-Smith et al. |
| 2007/0166674 A1 | 7/2007 | Kochunni |
| 2007/0174246 A1 | 7/2007 | Sigurdsson |
| 2007/0183493 A1 | 8/2007 | Kimpe |
| 2007/0185915 A1 | 8/2007 | Prahlad et al. |
| 2007/0208788 A1 | 9/2007 | Chakravarty et al. |
| 2007/0214330 A1 | 9/2007 | Minami et al. |
| 2007/0220308 A1 | 9/2007 | Yeung et al. |
| 2007/0226320 A1 | 9/2007 | Hager et al. |
| 2007/0226535 A1 | 9/2007 | Gokhale |
| 2007/0239501 A1* | 10/2007 | Cunningham ......... G06Q 10/06 705/70 |
| 2007/0250810 A1 | 10/2007 | Tittizer |
| 2007/0271308 A1 | 11/2007 | Bentley et al. |
| 2007/0288861 A1 | 12/2007 | Tabellion et al. |
| 2007/0296258 A1 | 12/2007 | Calvert et al. |
| 2008/0016310 A1 | 1/2008 | Ghosal et al. |
| 2008/0022003 A1 | 1/2008 | Alve |
| 2008/0033903 A1 | 2/2008 | Carol et al. |
| 2008/0126302 A1 | 5/2008 | Mora et al. |
| 2008/0155205 A1 | 6/2008 | Gokhale |
| 2008/0177994 A1 | 7/2008 | Mayer |
| 2008/0263297 A1 | 10/2008 | Herbst et al. |
| 2008/0263565 A1 | 10/2008 | Luther |
| 2008/0282048 A1 | 11/2008 | Miura |
| 2008/0288947 A1 | 11/2008 | Gokhale et al. |
| 2008/0288948 A1 | 11/2008 | Attarde et al. |
| 2008/0320319 A1 | 12/2008 | Muller et al. |
| 2009/0119322 A1 | 5/2009 | Mills |
| 2009/0150168 A1 | 6/2009 | Schmit |
| 2009/0171883 A1 | 7/2009 | Kochunni |
| 2009/0187908 A1 | 7/2009 | He |
| 2009/0228531 A1 | 9/2009 | Baumann |
| 2009/0307448 A1 | 12/2009 | Gokhale |
| 2009/0319534 A1 | 12/2009 | Gokhale |
| 2009/0320029 A1 | 12/2009 | Kottomtharayil |
| 2009/0320033 A1 | 12/2009 | Gokhale |
| 2010/0005259 A1 | 1/2010 | Prahlad |
| 2010/0031017 A1 | 2/2010 | Gokhale et al. |
| 2010/0036772 A1 | 2/2010 | Arceneaux |
| 2010/0070466 A1 | 3/2010 | Prahlad |
| 2010/0070474 A1 | 3/2010 | Kamleshkumar |
| 2010/0070725 A1 | 3/2010 | Prahlad et al. |
| 2010/0070726 A1 | 3/2010 | Ngo et al. |
| 2010/0076932 A1 | 3/2010 | Lad |
| 2010/0114837 A1 | 5/2010 | Prahlad |
| 2010/0125477 A1 | 5/2010 | Mousseau |
| 2010/0161773 A1 | 6/2010 | Prahlad |
| 2010/0172301 A1 | 7/2010 | Watfa |
| 2010/0180332 A1 | 7/2010 | Ben-Yochanan |
| 2010/0205582 A1 | 8/2010 | Liu |
| 2010/0250549 A1 | 9/2010 | Muller |
| 2010/0262911 A1 | 10/2010 | Kaplan et al. |
| 2010/0299490 A1 | 11/2010 | Attarde et al. |
| 2010/0306283 A1 | 12/2010 | Johnson et al. |
| 2010/0306643 A1 | 12/2010 | Chabot et al. |

(56) References Cited

U.S. PATENT DOCUMENTS

| | | |
|---|---|---|
| 2010/0332401 A1 | 12/2010 | Prahlad |
| 2010/0332454 A1 | 12/2010 | Prahlad |
| 2010/0332456 A1 | 12/2010 | Prahlad et al. |
| 2010/0332479 A1 | 12/2010 | Prahlad |
| 2011/0016091 A1 | 1/2011 | Prahlad |
| 2011/0069179 A1 | 3/2011 | Bathiche et al. |
| 2011/0093471 A1 | 4/2011 | Brockway et al. |
| 2011/0138225 A1 | 6/2011 | Gunabalasubramaniam et al. |
| 2011/0153723 A1 | 6/2011 | Mutnuru et al. |
| 2011/0161299 A1 | 6/2011 | Prahlad et al. |
| 2011/0173171 A1 | 7/2011 | De Meno et al. |
| 2011/0173202 A1 | 7/2011 | Paknad et al. |
| 2011/0231362 A1 | 9/2011 | Attarde et al. |
| 2011/0231459 A1 | 9/2011 | Hiraiwa et al. |
| 2011/0302141 A1 | 12/2011 | Nadathur |
| 2012/0011515 A1 | 1/2012 | Jolfaei |
| 2012/0014252 A1 | 1/2012 | Martin |
| 2012/0036108 A1 | 2/2012 | Prahlad et al. |
| 2012/0066633 A1 | 3/2012 | Saito |
| 2012/0084524 A1 | 4/2012 | Gokhale |
| 2012/0084782 A1 | 4/2012 | Chou |
| 2012/0094674 A1 | 4/2012 | Wu |
| 2012/0150818 A1 | 6/2012 | Retnamma |
| 2012/0150826 A1 | 6/2012 | Retnamma |
| 2012/0159499 A1 | 6/2012 | Shafiee et al. |
| 2012/0203742 A1 | 8/2012 | Goodman et al. |
| 2012/0254116 A1 | 10/2012 | Thereka et al. |
| 2012/0254119 A1 | 10/2012 | Kumarasamy et al. |
| 2012/0254824 A1 | 10/2012 | Bansod |
| 2012/0263191 A1 | 10/2012 | Baron |
| 2012/0265754 A1 | 10/2012 | Kottomtharayil et al. |
| 2012/0272205 A1 | 10/2012 | Fox |
| 2012/0275598 A1 | 11/2012 | Vimpari et al. |
| 2012/0317085 A1 | 12/2012 | Green et al. |
| 2013/0006625 A1 | 1/2013 | Gunatilake et al. |
| 2013/0007710 A1 | 1/2013 | Vedula |
| 2013/0013883 A1 | 1/2013 | Kottomtharayil |
| 2013/0024429 A1 | 1/2013 | Raas |
| 2013/0024568 A1 | 1/2013 | Popczynski |
| 2013/0046817 A1 | 2/2013 | Isbister |
| 2013/0104027 A1 | 4/2013 | Bennett et al. |
| 2013/0110854 A1 | 5/2013 | Kimber et al. |
| 2013/0111326 A1 | 5/2013 | Lockhart |
| 2013/0124534 A1 | 5/2013 | Dinh et al. |
| 2013/0136253 A1 | 5/2013 | Liberman Ben-Ami et al. |
| 2013/0145376 A1 | 6/2013 | Gokhale et al. |
| 2013/0179405 A1 | 7/2013 | Bunte |
| 2013/0219458 A1 | 8/2013 | Ramanathan et al. |
| 2013/0227352 A1* | 8/2013 | Kumarasamy ...... G06F 11/1461 714/47.1 |
| 2013/0232184 A1 | 9/2013 | Grube |
| 2013/0238562 A1 | 9/2013 | Kumarasamy |
| 2013/0238969 A1 | 9/2013 | Smith et al. |
| 2013/0262387 A1 | 10/2013 | Varadharajan |
| 2013/0262396 A1 | 10/2013 | Kripalani |
| 2013/0262410 A1 | 10/2013 | Liu et al. |
| 2013/0262615 A1 | 10/2013 | Ankireddypalle |
| 2013/0262706 A1 | 10/2013 | Stahlberg |
| 2013/0326159 A1 | 12/2013 | Vijayan |
| 2013/0332412 A1 | 12/2013 | Amarendran |
| 2014/0025641 A1 | 1/2014 | Kumarasamy |
| 2014/0026000 A1 | 1/2014 | Ma |
| 2014/0040210 A1 | 2/2014 | Avery |
| 2014/0040580 A1 | 2/2014 | Kripalani |
| 2014/0046900 A1 | 2/2014 | Kumarasamy |
| 2014/0046904 A1 | 2/2014 | Kumarasamy |
| 2014/0086127 A1 | 3/2014 | Kim |
| 2014/0108351 A1 | 4/2014 | Nallathambi |
| 2014/0108355 A1 | 4/2014 | Prahlad |
| 2014/0108470 A1 | 4/2014 | Lad |
| 2014/0150023 A1 | 5/2014 | Gudorf |
| 2014/0172793 A1 | 6/2014 | Stritzel |
| 2014/0180664 A1 | 6/2014 | Kochunni |
| 2014/0181032 A1 | 6/2014 | Kumarasamy |
| 2014/0181037 A1 | 6/2014 | Pawar |
| 2014/0181045 A1 | 6/2014 | Pawar |
| 2014/0181085 A1 | 6/2014 | Gokhale |
| 2014/0181443 A1 | 6/2014 | Kottomtharayil |
| 2014/0188805 A1 | 7/2014 | Vijayan |
| 2014/0188812 A1 | 7/2014 | Vijayan |
| 2014/0189432 A1 | 7/2014 | Gokhale |
| 2014/0201140 A1 | 7/2014 | Vibhor |
| 2014/0201142 A1 | 7/2014 | Varadharajan |
| 2014/0201150 A1 | 7/2014 | Kumarasamy |
| 2014/0201154 A1 | 7/2014 | Varadharajan |
| 2014/0201155 A1 | 7/2014 | Vijayan |
| 2014/0201161 A1 | 7/2014 | Kumarasamy |
| 2014/0201162 A1 | 7/2014 | Kumarasamy |
| 2014/0201171 A1 | 7/2014 | Vijayan |
| 2014/0250076 A1 | 9/2014 | Lad |
| 2014/0279922 A1 | 9/2014 | Kottomtharayil et al. |
| 2014/0281214 A1 | 9/2014 | Rehm |
| 2014/0289189 A1 | 9/2014 | Chan |
| 2014/0289196 A1 | 9/2014 | Chan |
| 2014/0365443 A1 | 12/2014 | Goel |
| 2015/0081948 A1 | 3/2015 | Thereska |
| 2015/0193229 A1 | 7/2015 | Bansod et al. |
| 2015/0227355 A1 | 8/2015 | Tripoli |
| 2015/0234879 A1 | 8/2015 | Baldwin |
| 2015/0244775 A1 | 8/2015 | Vibhor |
| 2015/0278024 A1 | 10/2015 | Barman et al. |
| 2015/0301903 A1 | 10/2015 | Mutha et al. |
| 2015/0324226 A1 | 11/2015 | Gokhale et al. |
| 2015/0324233 A1 | 11/2015 | Gokhale |
| 2015/0331899 A1 | 11/2015 | Gokhale et al. |
| 2015/0347238 A1 | 12/2015 | Kumarasamy et al. |
| 2016/0110266 A1 | 4/2016 | Nara |
| 2017/0024152 A1 | 1/2017 | Bhagi et al. |
| 2017/0024286 A1 | 1/2017 | Vijayan |
| 2017/0134492 A1 | 5/2017 | Klose et al. |
| 2017/0160970 A1 | 6/2017 | Gokhale |
| 2017/0160971 A1 | 6/2017 | Gokhale |
| 2017/0199924 A1 | 7/2017 | Gokhale |
| 2017/0206018 A1 | 7/2017 | Nara et al. |
| 2017/0206112 A1 | 7/2017 | Gokhale |
| 2018/0011767 A1 | 1/2018 | Kochunni et al. |
| 2018/0013825 A1 | 1/2018 | Klose et al. |
| 2018/0129435 A1 | 5/2018 | Bhagi et al. |
| 2018/0225177 A1 | 8/2018 | Bhagi et al. |
| 2018/0275881 A1 | 9/2018 | Ashraf |
| 2018/0285201 A1 | 10/2018 | Bangalore |
| 2018/0285209 A1 | 10/2018 | Liu |
| 2018/0285353 A1 | 10/2018 | Rao |
| 2019/0065509 A1 | 2/2019 | Liu et al. |
| 2019/0073254 A1 | 3/2019 | Vibhor et al. |
| 2019/0087108 A1 | 3/2019 | Bhagi et al. |
| 2019/0138397 A1 | 5/2019 | Kottomtharayil |
| 2019/0243911 A1 | 8/2019 | Kobozev et al. |
| 2019/0278668 A1 | 9/2019 | Kochunni et al. |
| 2019/0286839 A1 | 9/2019 | Mutha et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0910019 | 4/1999 |
| EP | 0981090 | 2/2000 |
| EP | 0986011 | 3/2000 |
| EP | 1035690 | 9/2000 |
| GB | 2216368 | 10/1989 |
| JP | 07046271 | 2/1995 |
| JP | 07073080 | 3/1995 |
| JP | 08044598 | 2/1996 |
| JP | 2000035969 | 2/2000 |
| JP | 2003531435 | 10/2003 |
| WO | WO9513580 | 5/1995 |
| WO | WO9912098 | 3/1999 |
| WO | WO0058865 | 10/2000 |
| WO | WO0106368 | 1/2001 |
| WO | WO0116693 | 3/2001 |

(56) References Cited

FOREIGN PATENT DOCUMENTS

| WO | WO0180005 | 10/2001 |
|----|-----------|---------|
| WO | WO2010057199 | 5/2010 |

OTHER PUBLICATIONS

"Multi Instancing," retrieved from http://documentation.commvault.com/hds/release_8_0_0/books_online_1/english_us/deployment/install/misc/multi_instancing.htm[Feb. 18, 2014 11:57:19 AM] on Feb. 18, 2014, 3 pages.

Abbot, K., et al., "Administration and Autonomy in a Republican-Transparent Distributed DBMS." VLDB. 1988.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, Jun. 12-16, 1994, pp. 124-126.

Examination Report in European Patent Application No. 09767119.2, dated Feb. 1, 2018, 3 pages.

Extended European Search Report for Application No. EP09767119, dated Feb. 11, 2013, 12 pages.

Gait, J., "The Optical File Cabinet: A Random-Access File System For Write-Once Optical Disks," *IEEE Computer*, vol. 21, No. 6, pp. 11-22 (Jun. 1988).

Hennessy et al., "Computer Architecture—A Quantitative Approach", 2nd Edition, 1996, pp. 246-250.

Hutchinson, Norman C., et al. "Logical vs. physical file system backup." OSDI. vol. 99. 1999, 12 pages.

International Search Report and Written Opinion for International Application No. PCT/US09/32325, dated Mar. 17, 2009, 11 pages.

Jander, M., "Launching Storage-Area Net," *Data Communications*, US, McGraw Hill, NY, vol. 27, No. 4 (Mar. 21, 1998), pp. 64-72.

Matthews, Jeanna, et al. "Data protection and rapid recovery from attack with a virtual private file server and virtual machine appliances." Proceedings of the IASTED International Conference on Communication, Network and Information Security (CNIS 2005). 2005, 14 pages.

Pitoura et al., "Locating Objects in Mobile Computing", IEEE Transactions on Knowledge and Data Engineering, vol. 13, No. 4, Jul./Aug. 2001, pp. 571-592.

Pollack, et al., "Quota enforcement for high-performance distributed storage systems," 24th IEEE Conference on Mass Storage Systems and Technologies (MSST 2007), Sep. 24-27, 2007, pp. 72-86.

Prigge, "Review: ExaGrid aces disk-to-disk backup," Jan. 3, 2013, InfoWorld, 12 pages.

Quinlan, Sean. "A cached worm file system." Software: Practice and Experience 21.12 (1991): 1289-1299.

Rosenblum et al., "The Design and Implementation of a Log-Structured File System," *Operating Systems Review SIGOPS*, vol. 25, No. 5, New York, US, pp. 1-15 (May 1991).

Rowe et al., "Indexes for User Access to Large Video Databases", Storage and Retrieval for Image and Video Databases II, IS,& T/SPIE Symp. On Elec. Imaging Sci. & Tech., Feb. 1994, pp. 1-12.

Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.

Wu, Chin-Hsien, Tei-Wei Kuo, and Li-Pin Chang. "Efficient initialization and crash recovery for log-based file systems over flash memory." Proceedings of the 2006 ACM symposium on Applied computing. ACM, 2006, 5 pages.

U.S. Appl. No. 09/609,977, filed Jul. 5, 2000, Prahlad.

U.S. Appl. No. 15/680,031, filed Aug. 17, 2017, Klose et al.

U.S. Appl. No. 15/682,085, filed Aug. 21, 2017, Kochunni et al.

U.S. Appl. No. 15/705,629, filed Sep. 15, 2017, Bhagi et al.

Cao, Lin et al. "Hybrid Caching for Cloud Storage to Support Traditional Application." 2012 IEEE Asia Pacific Cloud Computing Congress (APCloudCC). IEEE, 2012, 5 pages.

Hirofuchi, Takahiro et al. "A Live Storage Migration Mechanism Over WAN for Relocatable Virtual Machine Services on Clouds." Proceedings of the 2009 9th IEEE/ACM International Symposium on Cluster Computing and the Grib. IEEE Computer Society, 2009, 7 pages.

Motamari, Pushparaj, "Snapshotting in Hadoop Distributed File System for Hadoop Open Platform as Service." Tecnico Lisboa, Thesis to obtain the Master of Science Degree in Information Systems and Computer Engineering, Sep. 2014, 72 pages.

Stender, Jan, "Snapshots in Large-Scale Distributed File Systems." Dissertation at the Humboldt University of Berlin, Jan. 2013, 139 pages.

\* cited by examiner

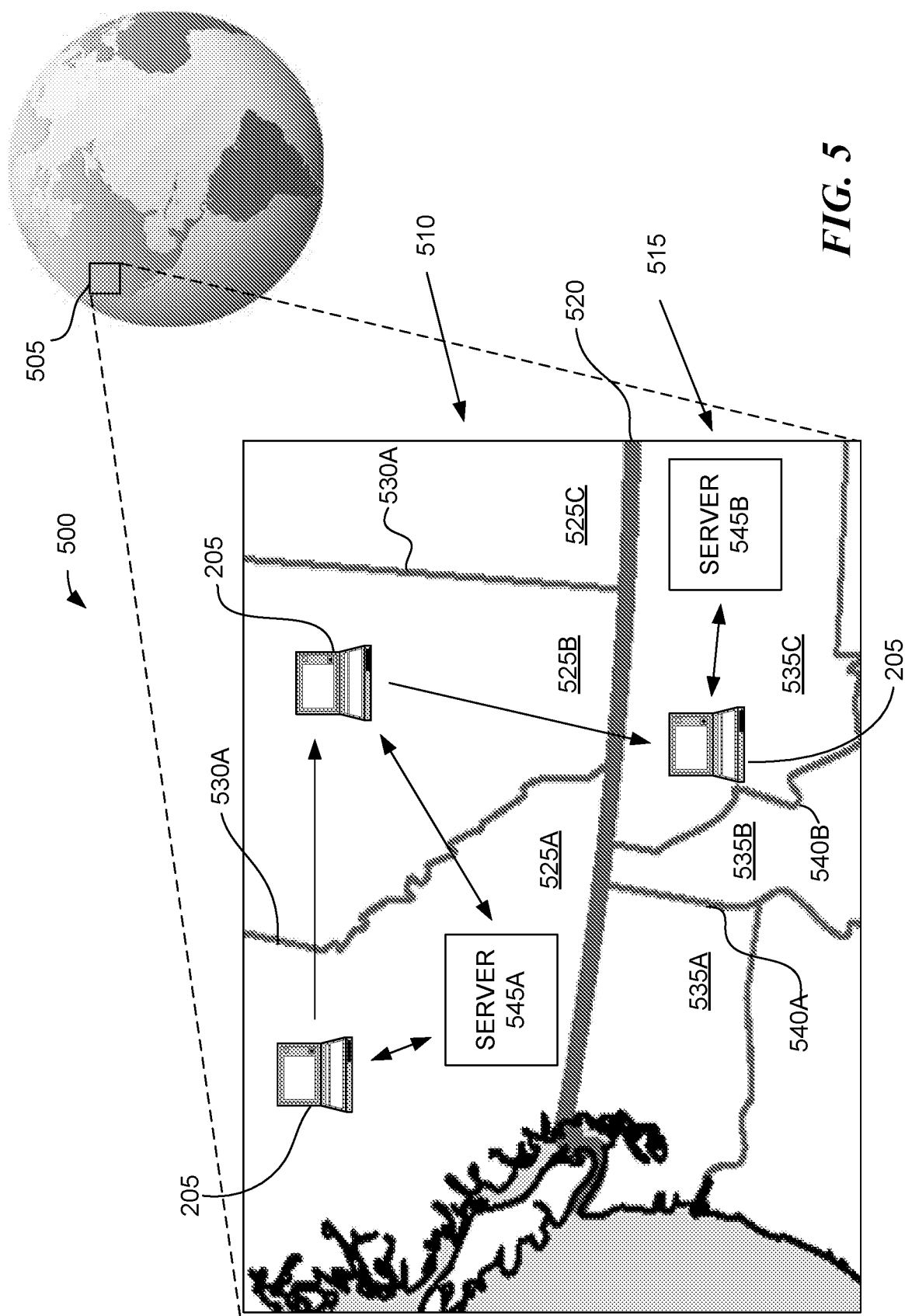

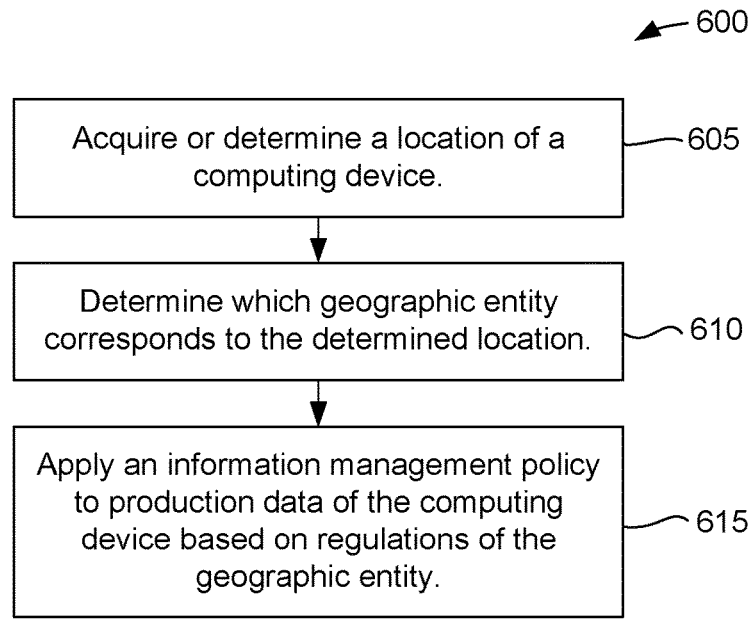
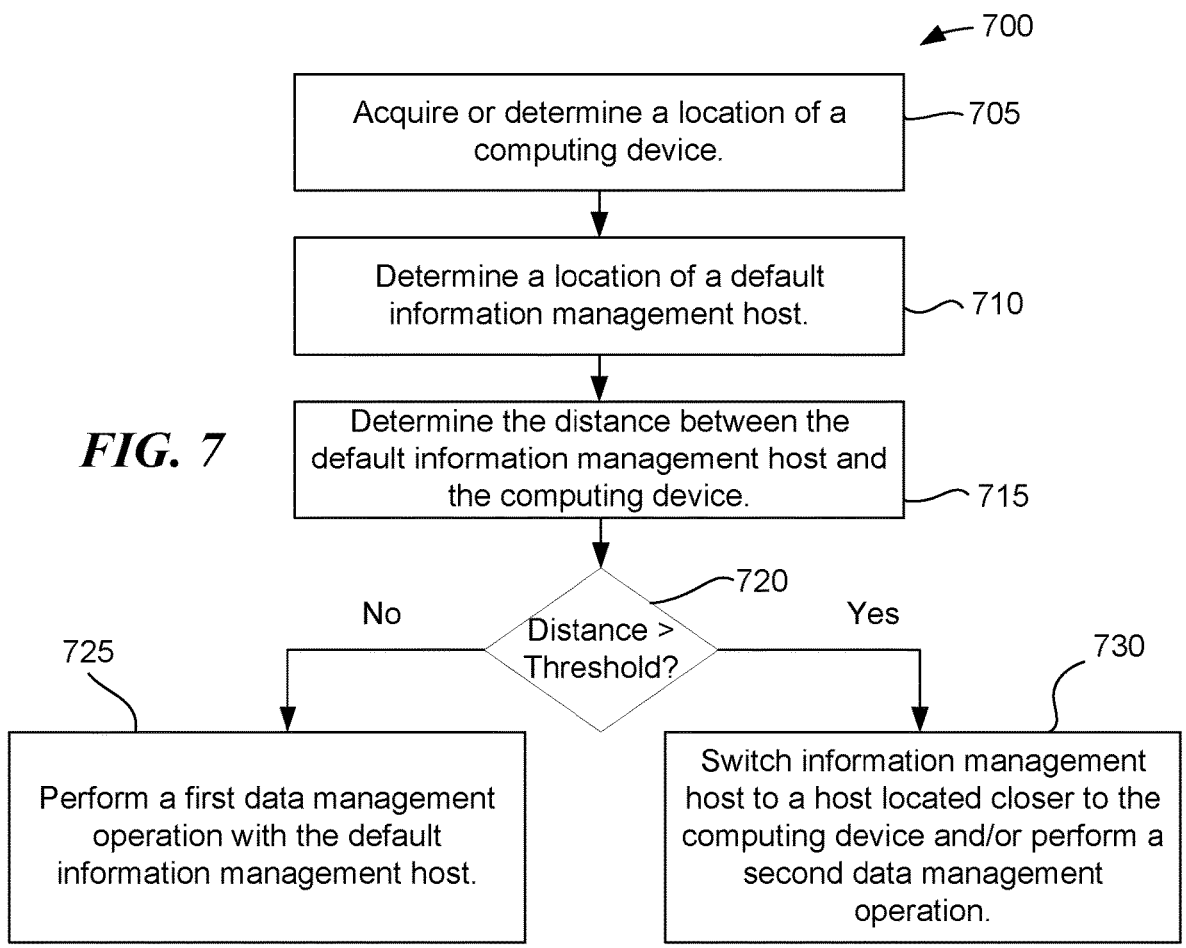

APPLICATION OF INFORMATION MANAGEMENT POLICIES BASED ON OPERATION WITH A GEOGRAPHIC ENTITY

CROSS-REFERENCE TO RELATED APPLICATION(S)

The present application is a continuation of U.S. patent application Ser. No. 15/470,689, filed Mar. 27, 2017, which is a continuation of U.S. patent application Ser. No. 13/728,386, filed Dec. 27, 2012, now U.S. Pat. No. 9,633,216, which are hereby incorporated herein by reference in their entireties.

BACKGROUND

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example, to prevent loss of data in the event a problem occurred with the data stored in primary storage.

To protect primary copy data or for other purposes, such as regulatory compliance, secondary copies (alternatively referred to as "data protection copies") can be made. Examples of secondary copies include a backup copy, a snapshot copy, a hierarchical storage management ("HSM") copy, an archive copy, and other types of copies.

A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

After an initial, full backup of a data set is performed, periodic, intermittent, or continuous incremental backup operations may be subsequently performed on the data set. Each incremental backup operation copies only the primary copy data that has changed since the last full or incremental backup of the data set was performed. In this way, even if the entire set of primary copy data that is backed up is large, the amount of data that must be transferred during each incremental backup operation may be significantly smaller, since only the changed data needs to be transferred to secondary storage. Combined, one or more full backup and subsequent incremental copies may be utilized together to periodically or intermittently create a synthetic full backup copy. More details regarding synthetic storage operations are found in commonly-assigned U.S. patent application Ser. No. 12/510,059, entitled "Snapshot Storage and Management System with Indexing and User Interface," filed Jul. 27, 2009, now U.S. Pat. No. 7,873,806, which is hereby incorporated by reference herein in its entirety.

An archive copy is generally a copy of the primary copy data, but typically includes only a subset of the primary copy data that meets certain criteria and is usually stored in a format other than the native application format. For example, an archive copy might include only that data from the primary copy that is larger than a given size threshold or older than a given age threshold and that is stored in a backup format. Often, archive data is removed from the primary copy, and a stub is stored in the primary copy to indicate its new location. When a user requests access to the archive data that has been removed or migrated, systems use the stub to locate the data and often make recovery of the data appear transparent, even though the archive data may be stored at a location different from the remaining primary copy data.

Many countries explicitly or impliedly regulate the retention of data for organizations operating within those countries. For example, in 2005 Italy adopted a European Union Directive on Privacy and Electronic Communications and requires Internet service providers to retain all data for at least 12 months. In response to the same European Union Directive, Denmark began requiring all telephone and Internet providers to log certain data regarding the communication through their systems, e.g., caller phone numbers, communication cells used for telephone calls, senders internet protocol (IP) addresses, and receiver IP addresses. Until Germany's high court overturned the law in 2010, for two years Germany required any communications data, such as email messages, to be retained for at least 6 months. Other countries, such as the United States, do not have explicit regulations in place for which data must be retained, but instead punish organizations for failure to retain or destroy data in a predetermined and systematic way. For example, a court in the United States determined that a college was negligent for deleting an email mailbox of a former employee because the college appeared to destroy the mailbox in a way that was inconsistent with a college-wide and systematic policy. The simple deletion of the email mailbox cost the college approximately $750,000.

For information technology (IT) groups of companies and organizations operating in within multiple countries, implementing data retention policies for each country can be challenging, especially when employees travel as part of their work. As an example, consider an employee who travels with a mobile device, such as a laptop, from the U.S. to Denmark for a week, to Italy for a week, and then back to the U.S. If an IT group implements a data retention policy that complies with the most restrictive regulation of any country the employee works within, many more data storage resources may be consumed than are required in the least restrict regulations. However, if members of the IT group fail to properly retain data in compliance with each country's regulations, fines for non-compliance against the company or organization could become costly. Additionally, dedicating members of an IT group to the task of tracking the travels of each employee for the purpose of changing the data retention policies of the each employee's mobile device may increase overhead costs associated with operations of the company or organization.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

BRIEF DESCRIPTION OF THE DRAWINGS

FIG. 5 is a diagram illustrating an example of a system to automate the application of geographic entity-based information management policies.

FIG. 6 is a flow chart representation of a process of applying geographic entity-based information management policies.

FIG. 7 is a flow chart representation of a process of providing a data retention host based on a geographic location of a host.

DETAILED DESCRIPTION

Figure 1:
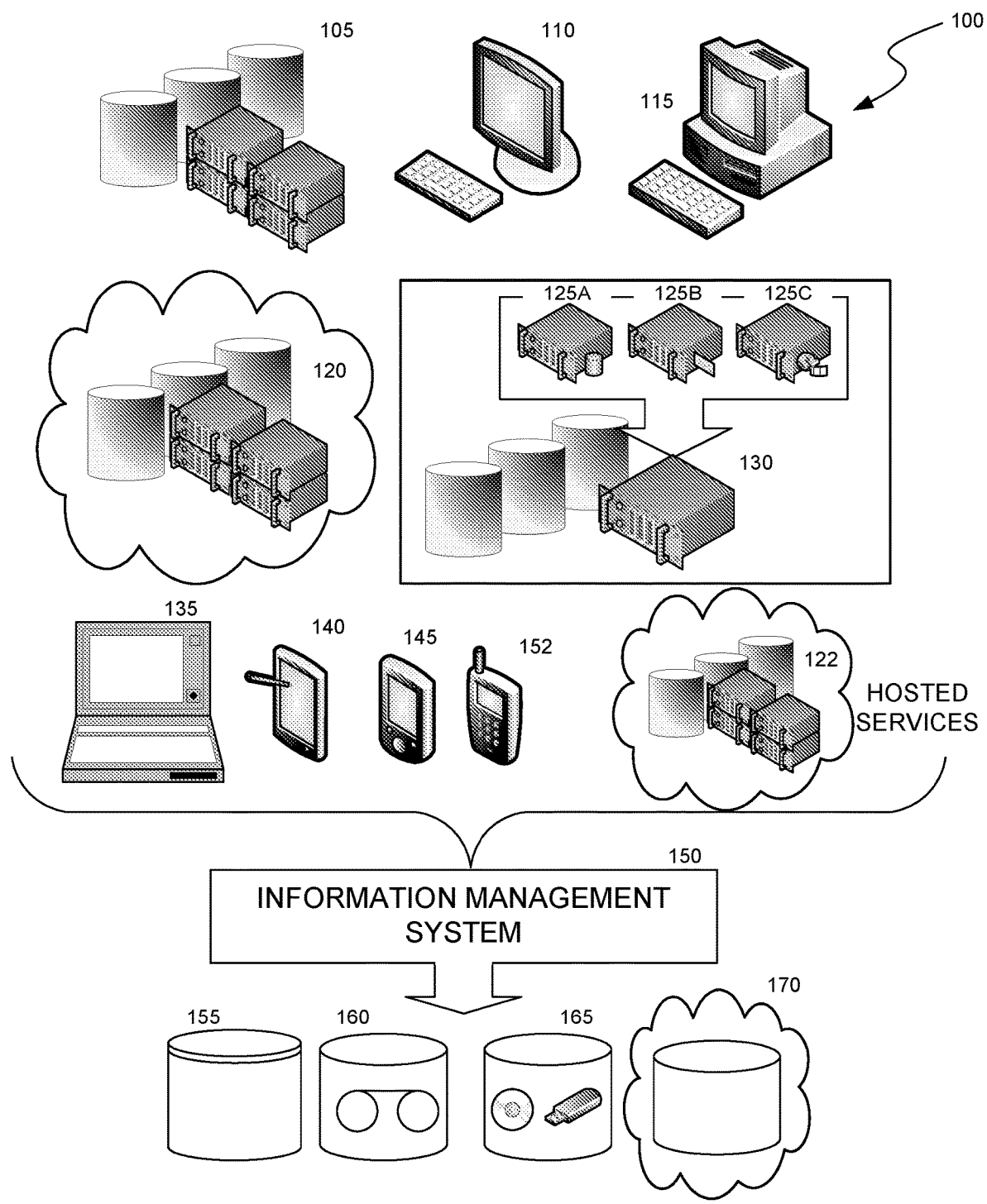
FIG. 1 is a block diagram illustrating an example of suitable information management environment in which aspects of the inventive system may operate.

The techniques disclosed in this document are useful in solving the above-discussed problems relating to the application of information management policies based on operations within a geographic entity or region, such as a state. In some aspects, a system determines and applies information management policies based on regulations governing the geographic entity in which a computing device is operates. In other aspects, the system varies the information management policy of the computing device based on the network connection speeds between the system and the computing device. In other aspects, the system provides security features for the computing device, such as remote erasure of primary or production copies data, based on the geographic entity or region within which the computing device is operated. Other features and advantages of the system are described below.

The headings provided herein are for convenience only and do not necessarily affect the scope or meaning of the disclosure.

Overview

Disclosed are systems and methods for applying information management policies based on operations within geographic entities. As used herein a "geographic entity" or region may include any politically recognized (or disputed) entity having one or more geographic boundaries, such as countries, territories, providences, prefectures, states, districts, counties, cities, townships, and the like. Many geographic entities have regulations for governing data retention which differ from the data retention regulations of other geographic entities. Information technology (IT) groups are tasked with ensuring that appropriate data information management policies are applied to each static or mobile computing device operating within a geographic boundary. However, as businesses geographically diversify and as business travel for employees increases in frequency and geographic diversity, updating information management policies, based on geographic entities and for companies having mobile computing devices used by traveling employees, may become both time and resource consuming.

The systems and methods disclosed below enable automated application of geographic entity-based information management policies. As used herein, an "information management policy" may include rules for scheduling the creation of non-production copies of data, data retention, migration of data to archive, restoration of non-production copies of data and information security. In one aspect, the system determines a location of a computing device, determines the geographic entity associated with the location, determines an information management policy based on regulations of the geographic entity, and applies the information management policy to the production copy of data on the computing device. In response to the computing device moving across geographic boundaries of geographic entities, the system may change the frequency of secondary copy operations, the duration of data retention, the type of secondary copy made, or the like. In another aspect, the system may change the frequency or type of secondary copy operations as the computing device moves closer to or further from an information management host. In another aspect, the system may change the frequency or type of secondary copy operations as network connection speeds between an information management host and the computing device improves or deteriorates.

The disclosed systems and methods also enable automated application of geographic-based security features. In one aspect, the system determines a location of a computing device, determines a geographic-based rule for operating the computing device, and selectively erases or wipes the primary copy of data on the computing device if the computing device is operating within a prohibited geographic entity or region. In other aspects, the system may enable a user to view a webpage that displays the logged locations of the computing device, and indicate via the webpage that the computing device was lost or stolen, e.g., if the user does not recognize the last logged location of the computing device. Through the webpage, the user may execute a remote erasure or wipe of the production copy of data on the computing device.

Various examples of the systems and methods will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the geographic entity-based system and related technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

In some implementations, production copies of data and metadata also include data that is not always stored in a persistent storage medium and may include some or all of any communications information and logged/captured metadata, e.g., internet protocol (IP) addresses, media access control (MAC) addresses, universal resource locators (URL), etc. for network nodes, access points, access sites, and the like. Production copies of data and metadata may also include identification of other devices that are communicated with or connected to, as well as information related to the locations of the devices during the communications and/or connections, e.g., global positioning system (GPS) data.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication Number 2010/0332456, which is hereby incorporated herein by reference in its entirety.

Figure 2:
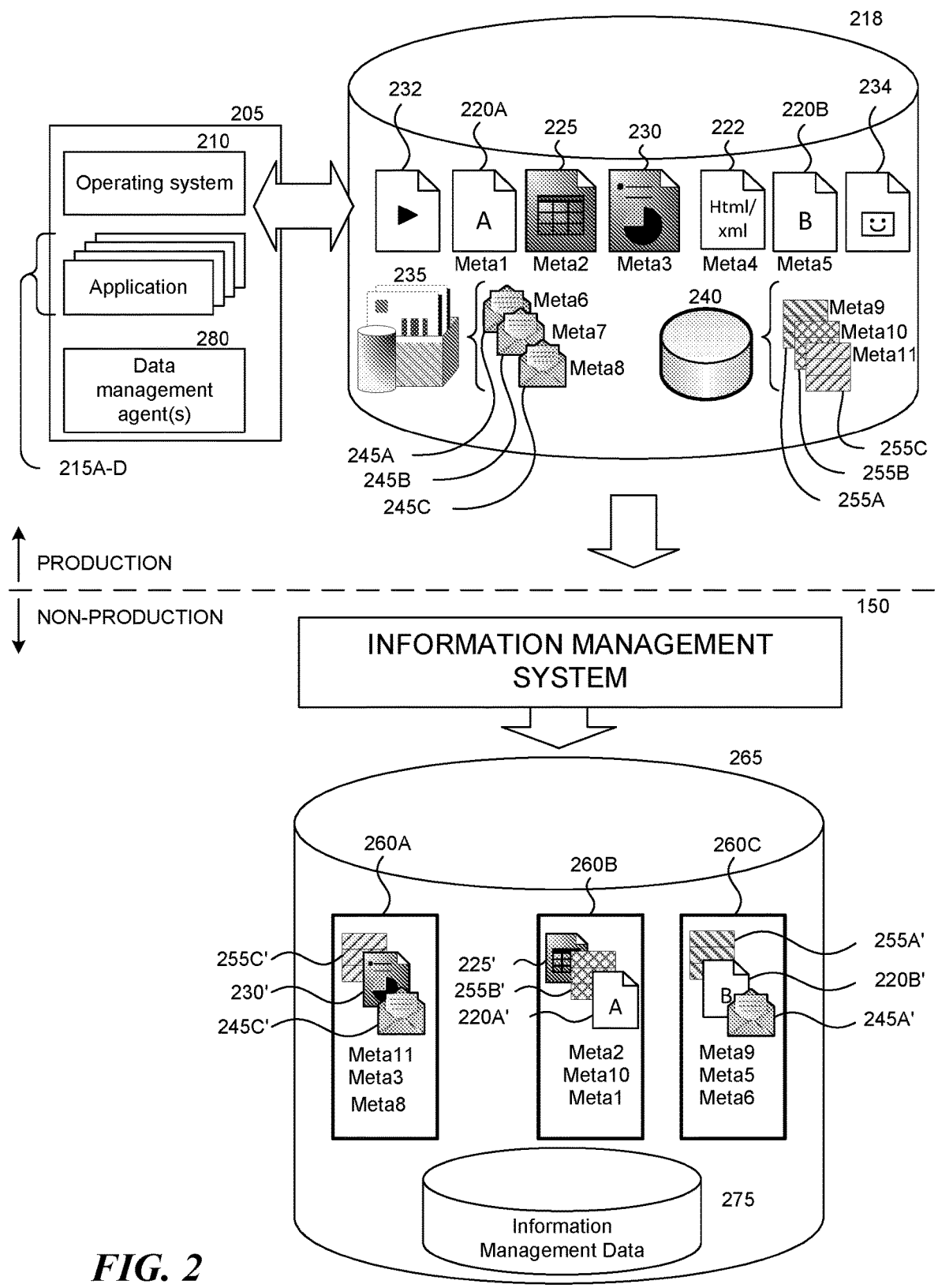
FIG. 2 illustrates examples of production and non-production data that may be processed by the information management environment of FIG. 1.

FIG. 2 helps illustrates some differences between "production copies" of data and metadata and "non-production copies" of data and metadata that are manipulated in the data management environment 100 based on the geographic entity in which the computing devices are operated. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offlline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
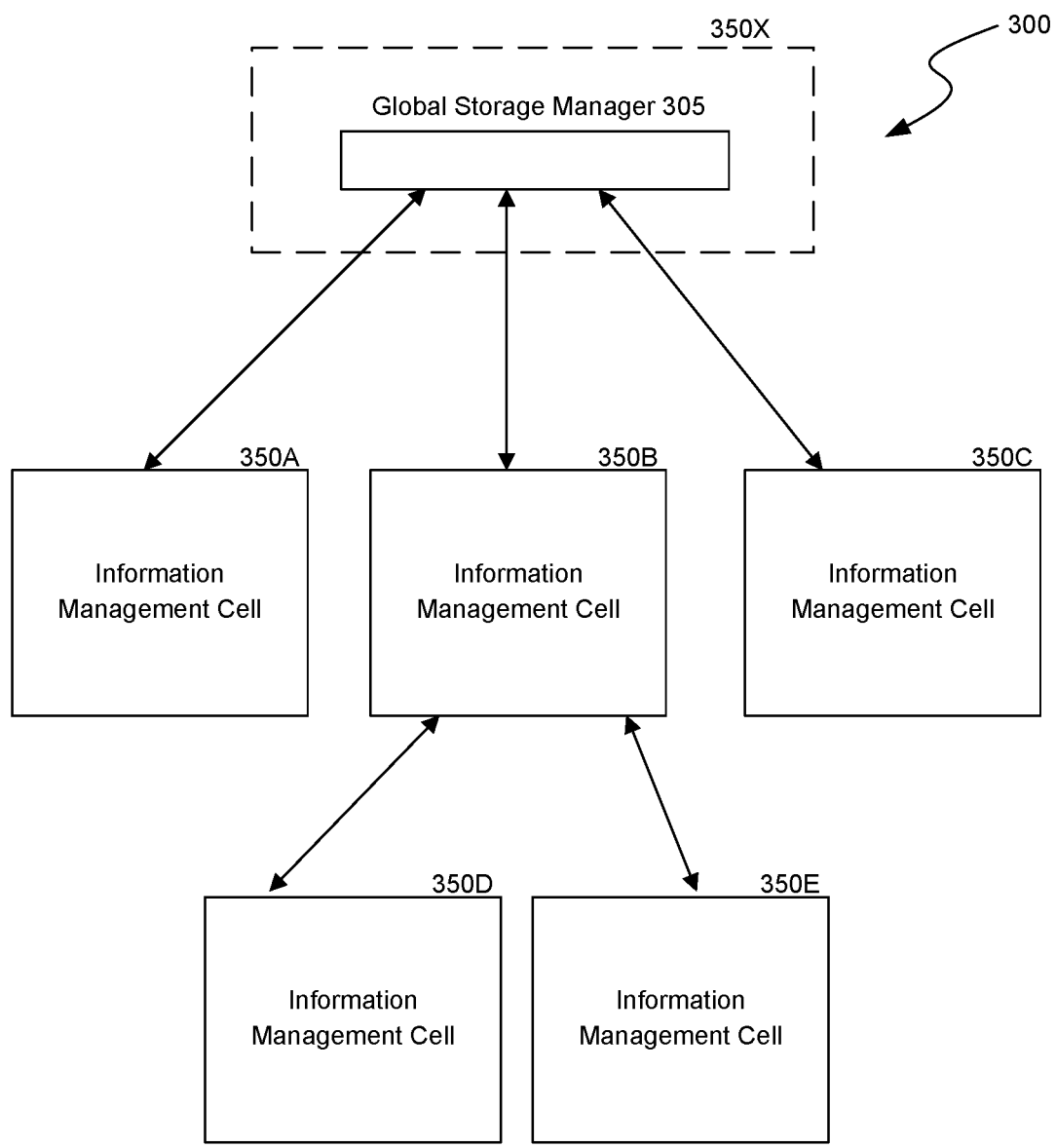
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. Each information management cell 350 can span one or more geographic entities, and the global storage manager 305 may also maintain and disseminate, to the various cells, system-wide information management data, such as distributing updates to information management policies that are based on the geographic entities covered by each information management cell 350. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
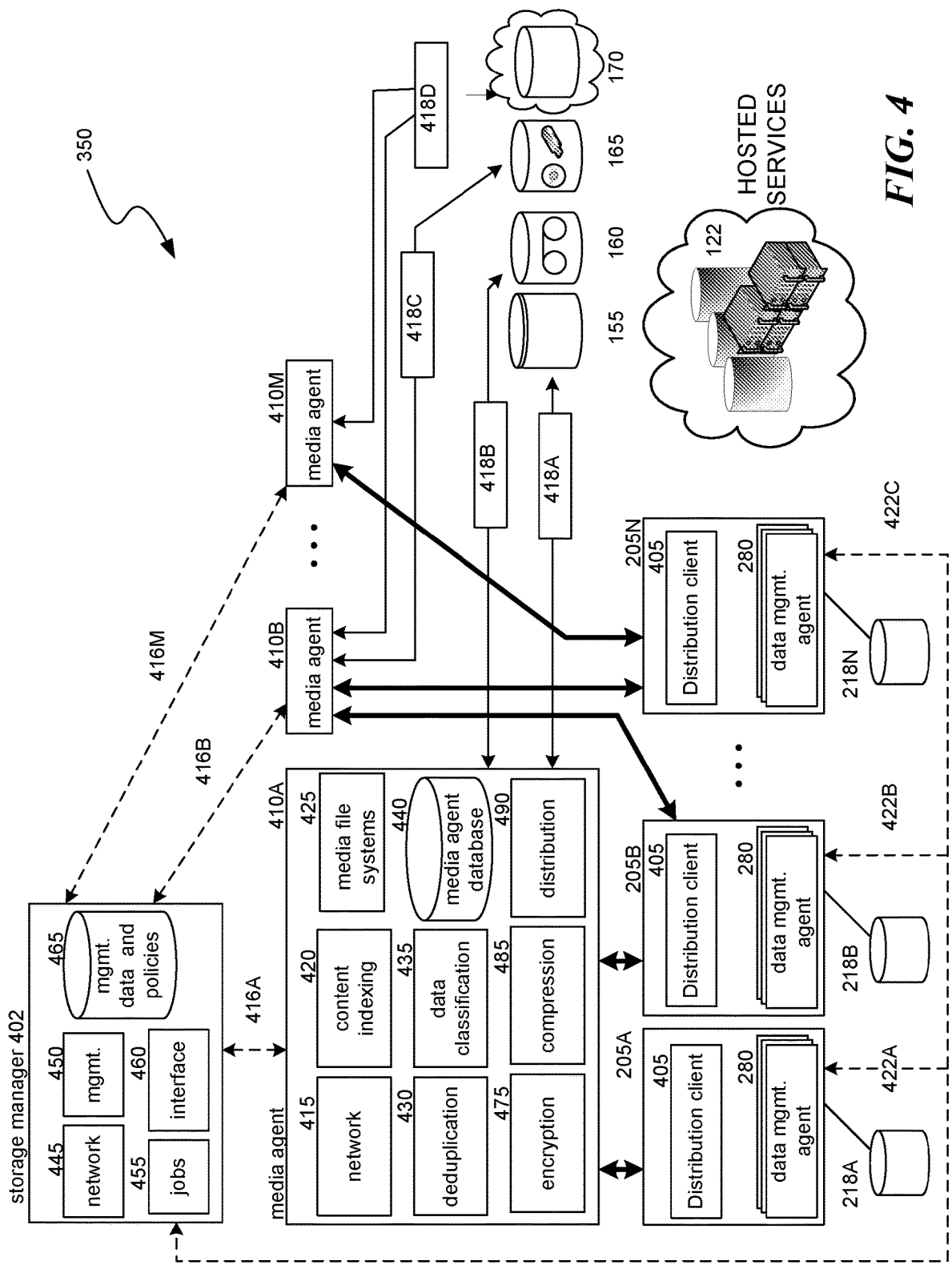
FIG. 4 is a block diagram illustrating an example of resources forming an information management cell.

FIG. 4 shows an arrangement of resources that may form an information management cell 350 that implements a geographic entity-based information management policy. As shown, the information management cell includes a storage manager 402, one or more media agents 410A-M, one or more non-production storage mediums 155-170, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each include a set of criteria and rules associated with performing an information management operation. The criteria may be used to determine which rules apply to a particular data object, system component, or information management operation, an may include:

- frequency with which a production or non-production copy of a data object or metadata has been or is predicted to be used, accessed, or modified;
- access control lists or other security information;
- the sensitivity (e.g., confidentiality) of a data object as determined by its content and/or metadata;
- time-related factors;
- deduplication information;
- the computing device, hosted service, computing process, or user that created, modified, or accessed a production copy of a data object; and
- an estimated or historic usage or cost associated with different components.

The rules may specify, among other things:

- a schedule for performing information management operations,
- a location (or a class or quality of storage media) for storing a non-production copy,
- preferences regarding the encryption, compression, or deduplication of a non-production copy,
- resource allocation between different computing devices or other system components (e.g., bandwidth, storage capacity),
- whether and how to synchronize or otherwise distribute files or other data objects across multiple computing devices or hosted services,
- network pathways and components to utilize (e.g., to transfer data) during an information management operation, and
- retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-170. Each media agent 410 may control one or more intermediary storage devices 418, such as a cloud server or a tape or magnetic disk library management system, to read, write, or otherwise manipulate data stored in a non-production storage medium 155-170. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

Services Based on Geographic Entity

A brief overview of certain aspects of the techniques described in greater detail below is now provided. Regulations for managing information, e.g., data retention, may change from one geographic entity or region to another. Manually updating information management policies manual may be a challenge for IT groups because of the frequency and ease with which employees travel with mobile or portable computing devices. Some of the techniques disclosed herein relate to determining and/or adjusting information management policies based on which geographic entity a computing device operates within. The disclosed techniques advantageously provide information management services more responsively than management by a person and provide information management services requiring support from significantly less personnel-resources.

Aspects of the technologies described herein may be practiced in an operational environment 500 that includes one or more geographic entities or regions. Operational environment 500 will now be described while referencing FIG. 5. As shown in FIG. 5, operational environment 500 may include any number of geographic entities. As noted above, a geographic entity or region may include any politically recognized or disputed entity having one or more geographic boundaries. Examples of geographic boundaries or entities include, but are not limited to, continents, countries, territories, providences, districts, prefectures, states, counties, ownership-disputed lands (e.g., China Sea Islands, the Gaza strip), oceans, lakes, sounds, rivers, and seas. Geographic boundaries may also include the airspace above any one or more of the identified types of geographic boundaries as well as the land or water beneath any one or more of the identified geographic boundaries on Earth. For illustration purposes, a subset of geographic boundaries 505 are illustrated from the Pacific Northwest of the United States and the Pacific Southwest of Canada. While the subset of geographic boundaries 505 identifies portions of the United States and Canada for illustration purposes, any set or subset of geographic boundaries on, above, or below Earth's surface may be used to implement aspects of the disclosed technologies.

FIG. 5 illustrates an example of the application of geographic entity-based information management policies to computing device 205. The subset of geographic boundaries 505 may include a first country 510, such as Canada, and a second country 515, such as the United States, separated from each other by a geographic boundary 520. The geographic boundary of the first country 510 may include additional geographic boundaries such as provinces 525A, 525B, 525C (cumulatively, provinces 525). The provinces 525 may be separated from each other by geographical boundaries 530A and 530B (cumulatively, geographic boundaries 530). The geographic boundary of the second country 515 may include further geographic boundaries such as states 525A, 525B, and 525C (cumulatively, states 525). The states 525 may be separated from each other by geographic boundaries 540A and 540B (cumulatively, geographic boundaries 540).

Operational environment 500 may include servers 545 (inclusive of servers 545A and 545B) communicatively coupled and configured to provide information management services to one or more computing devices 205, according to geographic entity-based information management policies. Each of servers 545 may include one or more components of an information management cell 350. For example, server 545A may include storage manager 402 and media agent 410A (shown in FIG. 4). In other implementations, server 545A may include just one of storage manager 402 and media agent 410A. 545B may include media agent 410B and may alternatively include storage manager 402. In each of the disclosed examples, the servers 545 may include, or may be configured to communicate with, one or more intermediary storage devices 418 and/or one or more non-production storage mediums 155-170 to store secondary copies of data (shown in FIG. 4).

Secondary Copy Services

One aspect of providing geographic entity-based information management services includes providing secondary copy services. The servers 545 may provide and adjust secondary copy services to the computing device 205 based on the geographic entity in which computing device 205 operates or based on the regulations of the geographic entity in which the computing device 205 operates The servers 545 can adjust several aspects of the secondary copy services, such as the type of copies, the frequency of the copies, and the scope of information included in copies based on data classification. For example, the server 545A may receive information from computing device 205 indicating that computing device 205 is operating in province 525A. In response to receiving information indicative of the location of computing device 205 or in response to determining the location of computing device 205, the server 545A may determine or adjust the secondary copy, data retention, data restoration, or other information management services provided to computing devices 205. For example, server 545A may be configured to perform a full backup copy of the production data of computing device 205 and be configured to subsequently create continuous incremental backup copies of the production data of computing device 205 while computing device 205 is located in province 525A.

If, however, the server 545A determines that the location of computing device 205 is within province 525B or 525C, the server 545A may downgrade the backup services from creating continuous incremental backup copies so that the server 545A only creates periodic, e.g., once a day, or intermittent, e.g., twice a week, backup copies. Advantageously, the server 545A may be configured to adjust the information management services provided to computing device 205 to compensate for increases in distance and degradation of connectedness between the server 545A and the computing device 205.

While the example of decreasing the periodicity of backup operations is provided above, to comply with geographic entity backup regulations, the server 545 may alternatively increase the frequency or quality of backup service provided, in response to the computing device 205 moving from one geographic entity to another. To illustrate, the server 545A may be configured to increase the frequency or quality of backup services provided to computing device 205, in response to the computing device 205 moving from the province 525A to province 525B. While the computing device 205 is located and operated in the province 525A, the server 545A may be configured to capture perform periodic backup operations with a first frequency, such as once a week. However, to comply with regulations of the province 525B, which may differ from backup regulations for province 535A, the server 545A may be configured to periodically perform periodic backup operations of the computing device 205 once every two days or once every day while the computing device 205 is operated in the province 525B.

In some implementations, the server 545A may be configured to create less-resource intensive types of backup copies to compensate for the increased frequency of backup operations. For example, when computing device 205 transitions operations from province 525A to province 525B, the server 545A may increase the frequency of backup copies but may create snapshot backup copies rather than creating full backup copies. Transitioning to snapshot backup operations advantageously reduces the bandwidth consumed between computing device 205 and server 545A during the backup operations, while enabling the server 545A to comply with information management regulations of the province 525B.

In some implementations, the server 545A may apply different rules for backup operations when computing device 205 transitions operations from the first country 510 to the second country 515 to comply with governmental information management regulations (hereafter, "regulations") of the second country 515, which may be different than regulations of the first country 510. For example, in response to computing device 205 transitioning operations from province 525B of the first country 510 to the state 535C of the second country 515, server 545A may continue creating periodic full backup copies with the frequency of once every two days or once every day. However, to comply with regulations that may exist in the second country 515, server 545A may increase the data retention duration for non-production copies or for archive copies of data created from production data generating while computing device 205 operates in the second country 515, e.g., from retaining copies of financial data for 5 years to retaining copies for 7 years. Alternatively or additionally, server 545A may increase the frequency of periodic full backup operations from once a day to twice a day to comply with data backup regulations that may exist in the second country 515.

The server 535A may cooperate with the server 545B to jointly host or provide geographic-based information management services to computing device 205. If, for example, the computing device 205 is operating in the second country 515 and network connection speeds between computing device 205 and server 545B are faster than the connection speeds between computing device 205 and server 545A, then server 545A may be configured to transfer responsibility providing backup service for computing device 205 to server 545B. In other words, based on the location of operation of computing device 205, a storage manager 402 that is located in province 525A may transition responsibility for computing device 205 from a media agent 410A located in province 535A to a media agent that is located nearer to computing device 205 or to a media agent which may share faster connection speeds with computing device 205, such as media agent 410B which may be part of server 545B. In other implementations, the server 545A may include a storage manager for a first information management cell, e.g., 350A, and may transfer all records and responsibility to the server 545B, which may be a storage manager for a second information management cell, e.g., 350B, in response to the computing device 205 moving from the first country 510 to the second country 515.

Copy operations may be implemented based on a combination of geographic and data classification criteria. For example, the system may classify data and permit specific data management operations to be performed, in part, based on those classifications. More details regarding data classification are found in commonly-assigned U.S. patent application Ser. No. 11/564,119 entitled "Systems and Methods for Classifying and Transferring Information in a Storage Network," filed Nov. 28, 2006, now U.S. Pat. No. 7,668,884, which is hereby incorporated by reference herein in its entirety. As an example, the system may classify data based on author/editor/recipient (e.g. a company's CEO), based on a department (e.g. the accounting department of the company), based on a project name (e.g. all documents associated with "Project Spock"), and so on. Then, based on geographic criteria, the system may combine data classification rules and geographic location rules to perform specific data copy or data management operations as described in detail herein.

Restoration Services

In addition to providing secondary copy services to computing device 205 based on the geographic entity within which computing device 205 operates, servers 545 may also provide location-based data restoration services. Servers 545A and 545B are two examples of many servers 545 that may be located within various geographic entities around the world. Servers 545 may be configured to move secondary copies of production data, i.e., non-production copies of data, to a server that is located geographically closest to the location of operation of computing device 205. For example, non-production copies of data for computing device 205 may be located on server 545A while computing device 205 operates in province 525A. However, when computing device 205 is operated in state 535C, the server 545A may be configured to transfer one or more non-production copies of data for computing device 205 to server 545B. Advantageously, transferring one or more non-production copies of data to server 545B may enable servers 545 to restore production data to computing device 205 more quickly.

In some implementations, server 545A may be configured to transfer non-production copies of data server 545B in response to computing device 205 operating in the second country 515 or in the state 535C for greater than a threshold time, e.g., one week. Alternatively, servers 545 may be configured to transfer secondary copies of production data for computing device 205 from one of servers 545 to another based on which of the servers 545 shares the fastest network connection speed with computing device 205.

Determining Location

Computing device 205 may employ various techniques for acquiring and/or providing its location or information that is relevant to its location. Computing device 205 may include a location acquisition device 550 configured to acquire the location at which communication device 205 operates. According to various implementations, location acquisition device 550 may be one or more of a network communication device, a satellite-based communication device, and a mobile communications device.

Location acquisition device 550 may be a network communications device and computing device 205 may determine its operating location based on communications with the network. For example, computing device 205 may use an assigned Internet protocol (IP) address, information from an Internet service provider (ISP), information from an access point, information from a gateway server, and/or information from a router to determine the city, county, district, province, state, territory, country, or other geographic entity, in which computing device 205 is operating.

For example, computing device 205 may execute a script or other software agent that first determines its own IP address, e.g., with the 'ipconfig' command, and next uses one or more internet-based IP address lookup services. Some internet-based IP address lookup services that return a city-level granularity of the location of an IP address include: www.geobytes.com/IpLocator.htm, www.ip2location.com, www.whatismyip.com/ip-tools/ip-adress-lookup, and whatismyipaddress.com.

The computing device 205 may instead be configured to use a software development kit (SDK) offered by, e.g. Skyhook Wireless of Boston Mass., which claims to be able to determine the position of a mobile device with a Wi-Fi position system with 10-20 meter accuracy. Alternatively or additionally, the script may access an IP lookup database that is installed on the computing device 205, such as the IP-Country Database or the IP-Country-Region-City-Latitude-Longitude-ZIPCode Database, which are available from IP2LOCATION™. Computing device 205 may be configured to further narrow its location by using other Internet-based tools such as JiWire, Wi-Fi ZONE Finder, or WiFinder to find a street address based on the name of a Wi-Fi transceiver or router that may be providing a network connection to the computing device 205. Regardless of the location determining process/technology used, the computing device may then transmit this location information to one or more of the servers 545 via a network.

Location acquisition device 550 may be a satellite-based communication device, and computing device 205 may determine its operating location via communications with one or more satellites. For example, location acquisition device 550 may be a global positioning satellite (GPS) receiver configured to determine latitude and longitude coordinates by using triangulation with a constellation of satellites orbiting the Earth. As another example, location acquisition device 550 may be a satellite transceiver configured to transmit and receive wireless communications with one or more satellites and may use communications techniques, such as time domain reflectometry (TDR), to determine its location on the Earth. The computing device 205 may then use one or more online or offline tools for translating latitude and longitude coordinates into a location having city-level granularity. Examples of online tools include iTouchMap.com, boulter.com/gps, maps.google-.com, and the like. Examples of offline tools include those available from www.openstreetmap.org, www.digital-topo-maps.com/gps-coordinates, or the like.

Location acquisition device 550 may be a mobile communications device, and computing device 205 may determine its operating location with the location acquisition device 550 via communications with one or more mobile communication cellular towers. Computing device 205 may receive its location from the one or more mobile communications cellular towers through the location acquisition device 550 directly, or computing device 205 may determine its location with respect to the one or more mobile communications cellular towers using various communications techniques such as those known to one of ordinary skill in the art. For example, many mobile wireless carriers, such as Verizon Wireless, make application programming interface (API) information available to enable programmers and users, subscribing to that carrier, to programmatically determine the location of a wireless tower. In particular, the Verizon Terminal Location API enables the development of mobile applications that provide information and services based on the current physical location of the subscriber. The Verizon Terminal Location API includes a getLocation function with which the computing device 205 may determine its location based on the location of one or more Verizon wireless towers. Alternatively, LOCAID of San Francisco, Calif. has developed tools for determining the location of a mobile device using a mobile directory number (MDN). LOCAID provides various API to enable programs to interface with its tool set. In particular, LOCAID's Get X/Y API can be used to obtain location information for the computing device 205 and LOCAID's Address API can be used to obtain geographical information for the computing device 205, such as address, city, and zip code.

Computing device 205 includes several components or modules through which it may communicate its location to one or more servers 545. Computing device 205 may communicate its location to servers 545 through a distribution client 405, through a data management agent 280, or through some other software module operating on computing device 205. Using any of the techniques disclosed above, computing device 205 may determine its location in terms of latitude and longitude coordinates or in terms of a particular geographic entity, e.g., a city, state, or country, for use by servers 545.

Servers 545 may be configured to determine which geographic entity computing device 205 is operating within. In one aspect, one or more servers 545 may receive latitude and longitude coordinates from computing device 205 and use one or more data structures, such as a lookup table, to determine the geographic boundary or entity to which the received coordinates correspond. In another aspect, servers 545 may receive an IP address from computing device 205 and use a data structure or Internet-based service to determine the location of the computing device 205.

Independent of the technique used by servers 545 to acquire or determine the location of computing device 205, servers 545 may be configured to record, log, or otherwise keep track of the location of computing device 205 and the respective dates and times the computing device 205 operated at those locations. As will be discussed in more detail below, servers 545 may make logs for the location of computing device 205 accessible to a user or/and IT administrator of the computing device 205, e.g., via a webpage.

Implementations of Geographic Entity-Based Information Management

Operational environment 500 may employ a number of methods, techniques, and/or steps to provide information management services to computing devices 205 using one or more of the systems, components, or environment disclosed in FIGS. 1-5. The following methods disclose examples of techniques that may be used to provide one or more of secondary copy, data retention, and restoration services for computing device 205 based on the geographic entity or location where computing device 205 is operated.

FIG. 6 illustrates a method 600 of providing information management services to a computing device based on a geographic entity where the computing device is operated. Providing geographic entity-based services enables an organization to employ more resource-intensive information management policies when required by regulations and to employ less resource-intensive information management policies when not needed. Such services can save organizations money because the services may decrease the overall amount of storage devices that need to be purchased and available for providing backup solutions. Additionally, because ISPs charge more for higher bandwidth connections and charge less for lower bandwidth connections, services that decrease overall bandwidth consumption and need may enable an organization to decrease the quality of service received from an ISP. If the organization is an ISP, then the disclosed services enable the ISP to free up bandwidth so that the ISP can sell it to paying customers. Consequently, providing and adjusting information management services based on a geographic entity where the computing device is operated can save an organization money.

At 605 a system acquires or determines a location of a computing device. The system may acquire or determine the location using any of the various techniques described above, as well as others.

At 610 the system may determine which geographic entity, if any, corresponds to the determined the location of the computing device. The system may acquire or determine the location using any of the various techniques described above, as well as others.

At 615, the system applies an information management policy to the production data of the computing device based on the regulations of the geographic entity in which the computing device produces the production data. The system may determine which regulation to apply by using a data structure, such as a look-up table or database, to find which frequency, duration, and data-type regulations, if any, correspond to the determined geographic entity. The system may then begin creating secondary copies of production data and otherwise set variables of an information management policy for the computing device based on the regulations found.

Many information management policies have been disclosed above, e.g., in connection with FIG. 4. Based on the regulations of geographic entity, the system may vary aspects of the information management policy, such as those shown below in Table 1.

TABLE 1

| Info. Mgm't Criterion | Some Applicable Variables |
| --- | --- |
| Frequency of copy | <backup duration>; <number of clients>; <storage capacity> |
| Deduplication | <storage capacity>; <size of data> |
| Schedule of operations | <network bandwidth>; <backup duration> |
| Type of storage media | <storage device speed>; <size of data>; |
| Encryption | <size of data>; <sensitivity of data>; <location of clients> |
| Compression | <storage capacity>; <network speed>; <backup duration> |

TABLE 1-continued

| Info. Mgm't Criterion | Some Applicable Variables |
| --- | --- |
| Distribution of data objects | <reliability of the storage devices>; <size of data> |
| Retention policies | <class of data>; <reliability of clients>; <storage device cost> |

Each aspect of the information management policy may depend on one or more other variables, thus, determining one aspect of the information management policy may include determining other characteristics of the information management system. Referring to Table 1, the frequency with which a production or non-production copy of a data object or metadata is created may depend upon how long each copy takes to create, the number of clients to be backed up, and the storage capacity of the system. Whether the system should dedicate the resources to deduplicating production data prior to creating secondary copies may depend upon the non-production storage media capacity and the size of the production data. If the production data is relatively small in size then it may not be as beneficial to dedicate the time or resource to deduplicate the data prior to creating secondary copies. When to schedule information management operations so as not to disrupt business operations may depend on the bandwidth of the network and the duration of each backup.

Determining the type of storage media to transfer secondary copies to may depend upon the speed of the non-production storage media and the size of the production data to be copied. Encryption and compression preference may depend on the size of the production data to be copied, the sensitivity of the data and the storage capacity of the non-production storage media. Whether the data objects are distributed across multiple storage devices or concentrated into a few may depend on the reliability of the non-production storage media. Retention policies may depend on the class of data, e.g., financial, medical, etc., the reliability of the clients, and the cost of the storage media, e.g., hard disk, tapes, etc. Other aspects of the information management policies may also be varied. While the information management policy criterion and examples of variables are illustrated in a table, any data structure can be used to organize or manage the criterion and variables used in defining and adjusting an information management policy.

An IT administrator or other person may populate and maintain the data structure that includes the regulations. The data structure may be sortable by geographic entity, e.g., by a geographic entity field in the data structure, so that when regulations for, as an example, Italy change, a person may easily update various aspects of the information management policy for Italy. In some implementations, the system may be connected to computing systems of regulatory bodies of geographic entities, e.g., countries, throughout the world and may be configured to parse regulatory information and automatically populate and/or update the data structure.

FIG. 7 illustrates a method 700 of selecting one of a number of information management hosts to provide information management services to a computing device, based on a distance between the information management hosts and the computing device. This method may be useful for organizations having multiple information management cells distributed across the world. Although a particular computing device may initially be assigned to and tracked by one storage manager or media agent of an information management cell, the information management system may provide faster or higher quality information management services by transferring responsibility of the storage device to a closer storage manager, media agent or other information management host.

At block 705, the system acquires or determines a location of the computing device. Any one or more of the methods described above for determining the location of a computing device may be used.

At block 710, the system determines the location of the default one of the number of information management hosts configured to provide information management services to the computing device. The default information management host may be the host, e.g., storage manager or media agent, to which the computing device was initially assigned. Thus, the default host may be determined by querying storage manager databases for the information management system identifier associated with the computing device.

At block 715, the system determines the distance(s) between the computing device and the default one of the number of hosts configured to provide information management services. In one aspect, the system determines the distance(s) between the computing device and the default one of the number of hosts by determining a minimum geographical distance. In one implementation, the minimum distance is determined by first determining the IP addresses of each device, using an IP address lookup tool (discussed above) to find the city/state of the location of each device, and inserting the location information for each device into a mapping application, such as Google Maps, Yahoo Maps, or another available mapping tool. In another aspect, the system determines the distance(s) between the computing device and the default one of the number of hosts by determining the distance of the minimum signal path, i.e., inclusive of network switches and transmission media.

The network distance between the computing device and the host may be measured by tracing the network path of a packet sent from the computing device to the host. The network path and the time it takes for the packet to travel the network path can be determined by, for example, the 'tracert' or 'traceroute' commands in Windows and Linux operating systems, respectively. Other programs, code, or commands can be used, but the trace route command returns the IP addresses of each of the series of IP routers that are used in delivering packets from the computing device to the host and the command returns information indicating the duration of each router to router hop. Using the same IP lookup techniques discussed above, each router location can be determined and the overall network distance can be summed by entering the locations of the routers into a mapping application. Alternatively, the distance can be estimated based on the duration, e.g., sum of all of the hops, for which the test packet travels from the computing device to the host.

At block 720 the system compares the minimum determined distance between the computing device and a default host to a threshold, e.g., 100 miles. If the determined distance does not exceed the threshold, the method proceeds to block 725. If the determined distance exceeds the threshold, the method proceeds to block 730.

At block 725, the system performs a first information management operation with the default host. An example of the default information management host may include the storage manager 402 and the media agent 410 located at the headquarter facilities of a company or organization. An example of a first information management operation may include creating non-production copies of data using a resource-intensive type of secondary copy, such as periodically creating full backup copies. Other options may include performing additional processing, such as deduplication, content indexing, encryption, and/or compress.

At block 730, the system may switch from the default host to another one of the number of hosts that is located closer to the computing device to provide information management services to the computing device. In other words, the system may switch from providing information management services to the computing device by a host located away from the computing device by a distance that is greater than the threshold, to providing information management services to the computing device by a host located away from the computing device by a distance that is less than or equal to the threshold.

Alternatively or additionally, at block 730, the system may perform a second information management policy. An example of a second information management policy may include creating non-production copies of data using a less resource-intensive type of secondary copy, such as creating a single full backup copy and subsequently creating periodic or intermittent incremental backup copies of data. Another example of a less-intensive secondary copy may include creating snapshot copies of data. Alternatively or additionally, the second information management policy may include longer time periods between the creation of secondary copies, as compared to the time periods between the creation of secondary copies under the first information management policy.

Figure 8:
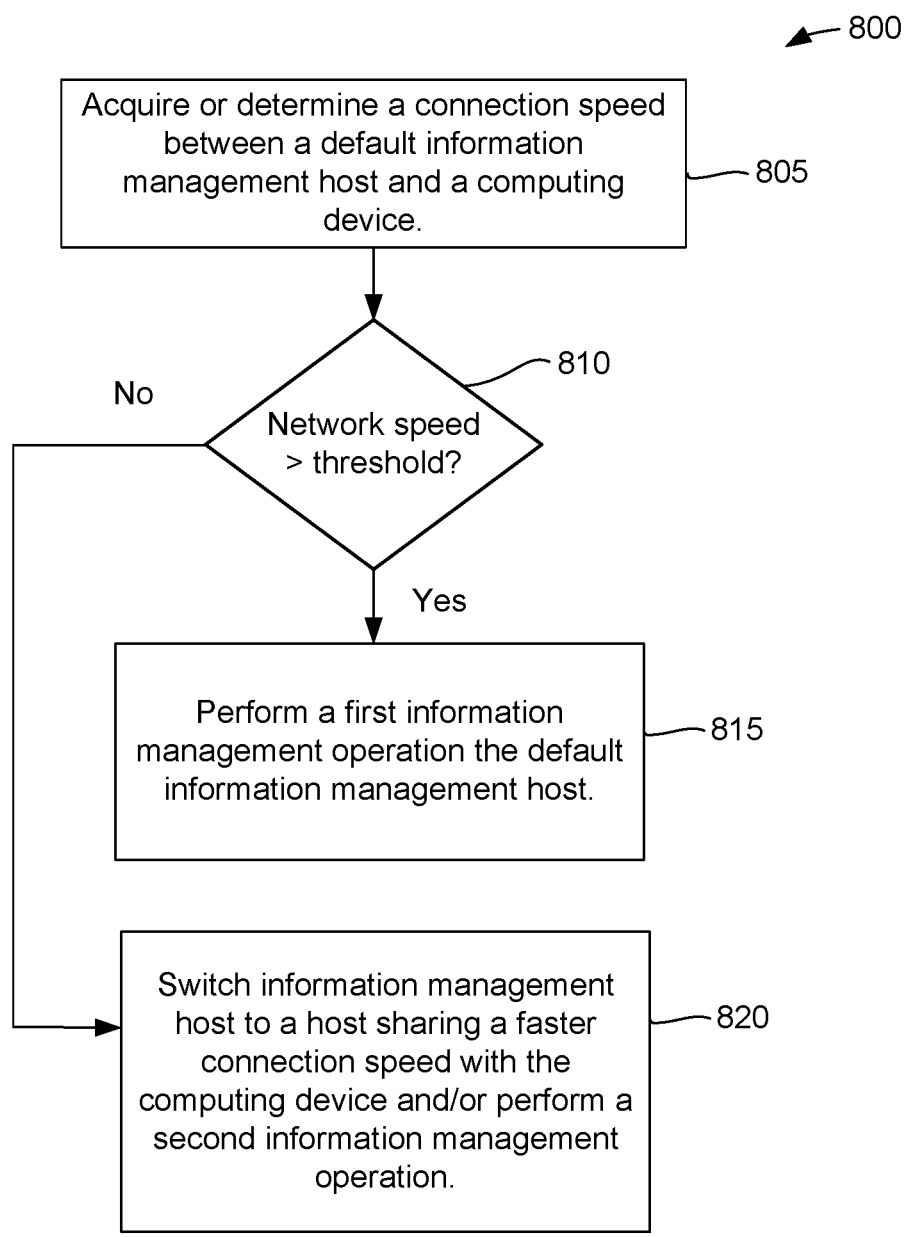
FIG. 8 is a flow chart representation of a process of providing an information management host based on a network connection speed with a host.

FIG. 8 illustrates a method 800 of selecting one of a number of information management hosts to provide information management services to a computing device, based on network speeds between the information management hosts and the computing device.

At block 805, a system acquires or determines a network connection speed between a default information management host and the computing device. For example, the system may measure the time it takes to transmit a file from the default host to the computing device and measure the time it takes the default host to receive a file from the computing device. The transmit times may be measured using utility commands or programs such as tracert, as described above. In some implementations, the default host sends a message response once the complete file has been received. The transmit time is subtracted from the received time to determine the transmit-receive duration, and the size of the packet is divided by the transmit-receive duration to determine the connection speed in bits per second.

At block 810 the system compares the determined network connection speed to a threshold, e.g., 10 Mbps (megabits per second). If the determined network speed exceeds the threshold, the method proceeds to block 815. If the determined network speed does not exceed the threshold, the method proceeds to block 820.

At block 815, the system performs a first information management operation with the default host. An example of a first information management operation may include creating a non-production copy of data using a resource-intensive type of secondary copy, which can be accommodated by the determined network speeds within a reasonable time frame, e.g., before the next backup operation is scheduled to occur.

At block 820, the system may switch from the default host to another one of the number of hosts that shares a faster network connection with the computing device. The system may determine which of the other ones of the number of hosts shares a faster network connection with the computing device by performing the example network test of block 805.

Alternatively or additionally, at block 820, the system may perform a second information management operation instead of the first information management operation. An example of a second information management operation may include creating a non-production copy of data using a less resource-intensive type of secondary copy, such as creating a full backup copy combined with subsequent periodic or intermittent incremental backup copies of production data. Another example of a less-intensive backup operation may include creating snapshot copies of data. Alternatively or additionally, the second information management operation may include longer time periods between backup operations, as compared to the time periods of backup operations for the first data retention policy.

To implement the methods 700 and/or 800, the system may use a data structure, such as Table 2, shown below. Table 2 includes a speed/distance column and

TABLE 2

| Speed Threshold (Distance) | Info. Mgm't Operation |
|---|---|
| below (above) | Perform operation 1 (e.g., snapshot copies) |
| above (below) | Perform operation 2 (e.g., full backup copies) | an information management operation column that is performed in response to the system characteristic of the speed/distance column. Simply, in response to determining that the system speed is below a threshold, or if the distance between components is above a threshold, then the information management system is configured to perform a less resource-intensive secondary copy, e.g., snapshot copies. If, however, the speed is above a threshold, of if the distance between components is below a threshold, then the information management system is configured to perform a more resource-intensive secondary copy, e.g., a full backup copy.

The techniques disclosed in methods 600, 700, and 800 offer many advantages to IT groups tasked with supporting employees that use mobile or portable computing devices for and during business travels. For example, by implementing the disclosed methods, IT groups may be able to more confidently report that non-production copies of data are being created with higher efficiency and speed than may be provided by assigning personnel resources to track the locations of computing device use. Moreover, the disclosed methods enable IT personnel to maintain a day-time work schedule by automating the adjustment of data retention policies. That is, if an organizations IT services are centralized somewhere in the United States, the IT services have to staff technicians around the clock in order to provide service to members/employees of the organization that are traveling in Asia or Europe, where the time zone differences can be 8-16 hours different. Without an automated switching of backup servers, IT personnel may need to be awake while employees travel so that the IT staff can reassign the computing device to nearest or fastest information management hosts. However, because the disclosed methods make such adjustments automatically, IT staff may maintain a day-time work schedule wherever they are located and independent of where the organizations members/employees travel.

Remote Security

Another aspect of the present disclosure includes systems and methods for providing security features to a computing device based on the location or geographic entity in which the computing device operates. These security features may enable a user of a computing device, an IT administrator in charge of the computing device, or the information management system communicatively coupled to the computing device, to remotely erase or wipe production copies of data from the computing device. These security features enable organizations and governments to protect sensitive or valuable information and will be discussed in terms of the following methods, tables, and interfaces.

As disclosed above, servers 545, may include one or more components of information management cell 350, and may be configured to log, track, and/or otherwise record the location of one or more computing devices 205. Servers 545 may save the location data of the computing device 205 in a data structure, such as a Table 3, illustrated below, and may perform operations related to remote security based on the information in Table 3.

TABLE 3

| Device ID | Date | Time | IP Address | Lat./Long. | Geo. Entity | Class |
|---|---|---|---|---|---|---|
| NJ_Laptop_25 | Jun. 1, 2012 | 12:01:36 | 173.191.3.8 | 37.583N, 127.000E | Seoul, South Korea | S |
| NJ_Laptop_25 | Jun. 1, 2012 | 14:01:36 | 178.131.6.1 | 37.972N, 126.555E | Kaesong, North Korea | S |

Table 3 includes examples of columns of data that servers 545 may save while logging locations of computing device 205. The device ID column includes a unique device identifier, which may be unique to the particular network, e.g., a corporate network, or may be globally unique. The data column includes a date of the log. The time column includes the time of an entry, for example in Greenwich mean time (GMT). The IP address column includes an IP address assigned to computing device 205 at the time of an entry. The latitude/longitude column includes latitude and longitude coordinates for the location of the computing device 205. The geographic entity column includes a specific name of the geographic entity or region in which the computing device 205 was operated during the log entry. The classification column includes a class or classification of the most sensitive information on the computing device 205. For example, the classification column may include an 'S' for secret information, a 'C' for confidential information, a 'B' for general business information, and a "P" for personal information. As will be discussed below, servers 545 may treat different classifications of information on computing device 205 differently. The order or content of the columns may vary from what is illustrated in accordance with various implementations. The first row of Table 3 shows an first entry that server 545 may enter into Table 3. The first entry indicates that computing device 205 is assigned a device ID of NJ_Laptop_025 and was operated in Seoul, South Korea at 12:01:36 GMT. The first entry also indicates that the computing device 205 was operated at latitude and longitude coordinates 37.5833° N, 127.0000° E and at that time was assigned an IP address of 173.191.3.8 while carrying secret information, as an example. The second entry in Table 3 indicates that the computing device 205 has crossed the border between North Korea and South Korea two hours after the first entry while operating with secret information.

Figure 9:
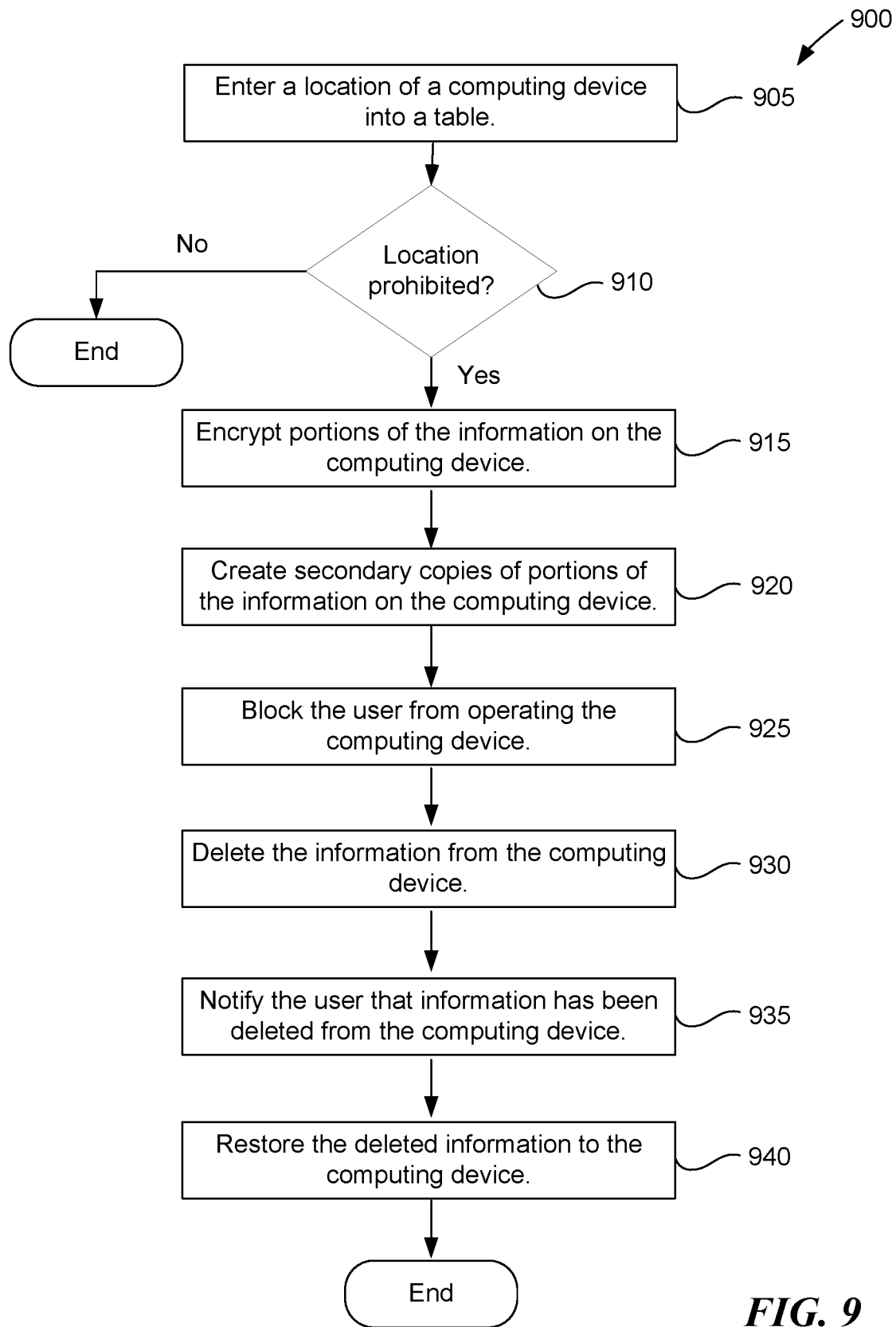
FIG. 9 illustrates an example of a method of managing information on a computing device based on the computing device operating in a prohibited country or region according to an access control list.

FIG. 9 illustrates a method 900 of managing information on a computing device based on the computing device operating in a prohibited country or region according to an access control list that may be installed onto one or more of the servers 545 or is provided on the laptop. An example of an access control list is provided below as Table 4.

TABLE 4

| Geographic Entity | Prohibited Information Classification |
|---|---|
| Libya | Secret |
| Sudan | Secret |
| Iraq | Confidential, Secret |
| North Korea | Business, Confidential, Secret |

Table 4 includes an access control list with a geographic entity column and a prohibited information classification column. The geographic entity column includes a few countries or regions to whom the export of specified goods, technologies, software, services, or other information may be restricted by a government or other organizational policy, such as the United States. The access control list enables an information management server to compare a location of a computer device to a particular set of rules prior to executing remote security operations. In some implementations, the access control list includes information from the U.S. export control list, or similar list.

At block 905, in this example, an information management server enters a location of a computing device into a table. The information management server may receive the location of the computing device from the computing device or may determine the location of the computing device using techniques such as an IP address lookup or a GPS coordinate lookup. The information management server may then create or update a table, database, or other data structure, such as Table 3, to include the location and/or other information that identifies the computing device.

At block 910, the information management server compares the location of the computing device in the table to a set of rules, such as the access control list of Table 4. The set of rules may include a list of geographic entities, e.g., countries, and a corresponding list of prohibited types or classifications of information for the geographic entities. As shown in Table 4, a computing device having only general business information or general business information and confidential information being operated in a geographic entity such as Libya is not prohibited, so the information management server takes no further action. However, the same computing device having general business information and confidential information would be prohibited in a geographic entity such as North Korea, according to the access list of Table 4. If the information management server to determines that the computing device is in a geographic entity where information is prohibited, the process proceeds to block 915 to perform security operations on the computing device.

At block 915, the information management server begins performing or initiates security operations, such as encrypting information on the computing device. In some implementations, the information management server instructs the computing device to encrypt those portions of the information on the computing device that are prohibited in the specific geographic entity. In other implementations, the information management takes a less secure approach and just password protects information on the computing device so that it is accessible to the user or others only after entering the password. Such an approach may be acceptable for less sensitive information or when the computing device is in less restricted geographic regions.

To encrypt or password protect some or all information on the computing device, the information management server may communicate with one or more agents or clients that are already installed on the computing system. In some implementations, the information management server transmits an encryption key, such as a public key, to the agent on the computing device along with instruction for the computing device to begin encryption. The information management system may retain a decryption key, such as a private key, and only distribute the decryption key once the information management server has determined that the computing device is no longer in the prohibited geographic entity. Other encryption methods may be used, using techniques known to those of ordinary skill in the art. Since encryption can be time consuming, the computing device may begin by encrypting information with a "secret" designation, followed by confidential information.

At block 920, the information management server creates secondary copies of some or all information on the computing device. The information management server may use one of a number of lightweight backup techniques to create a secondary copy of just the portions of the information on the computing device that are prohibited for the geographic entity. For example, the information management server may create a differential secondary copy that merely saves the differences between the previous non-production data and the present state of the information on the computing device. Furthermore, the information management server may create a secondary copy just of specific file types, folders, or information associated with one or more particular applications, for example all files associated with a computer-aided design application, e.g., Microsoft Visio.

The information management server stores the secondary copies on servers that are not located in the prohibited geographic entity. Preferably, the information management system may store the secondary copies on servers that are located near the last permitted geographic entity where the computing device was operated. In other implementations, the information management server may store the secondary copies on servers that are located near, but not within, the prohibited geographic entity so that the data may be quickly restored to the computing device if the computing device is moved out of the prohibited geographic entity.

At block 925, the information management server may block the user from operating the computing device to prevent the user from transferring information from the computing device. Before, after, or while the information management server creates secondary copies of portions or all of the information on the computing device, the information management server may prevent the user from transferring information from the computing device or even shutting down the computing device.

At block 930, the information management server may delete some or all of the information on the computing device i.e. the local copies, if necessitated by the regulations, the above-noted table or other rules. After creating a secondary copy of the information, the surest prophylactic measure to ensure that the prohibited information is not transferred may be to completely remove the information from the computing device and perform multiple overwrites of data to ensure no recovery of the previously existing data may be performed.

At block 935, the information management server may notify the user of the deletion by simply providing a dialog box on the screen of the computing device to indicate that information has been deleted and that the information will not be restored until the information management server has confirmed that the computing device is no longer within the prohibited geographic entity. Alternatively or additionally, the information management server may send a message to the computing device, such as to an email address. Alternatively or additionally, the system may use telecommunication systems, such as short message service (SMS) or multimedia messaging service (MMS) to a mobile device registered with the user, At block 940, the information management server monitors the location of the computing device. Although selected portions of the information of the computing device may have been deleted from the computing device, other agents or clients installed on the computing device report network information or location information for the computing device continue to operate. In response to the information management server determining that the location of the computing device is no longer in a prohibited geographic entity, the information management server may provide notification to user of steps to follow to restore the deleted information. In some implementations, the restoration process uses one or more of the techniques for data restoration that were discussed above. Alternatively, the server may automatically rewrite deleted data to the computing device once it is back in an acceptable geographic region.

The servers 545 may use the information of Table 3, or other saved formats of location data for computing device 205, to provide other security services as well. For example, servers 545 may make security services related to computing device 205 available via a webpage, mobile device application, or other remotely accessible software, based on the information of Table 3, as shown in FIG. 10.

Remote Security Webpage

Figure 10:
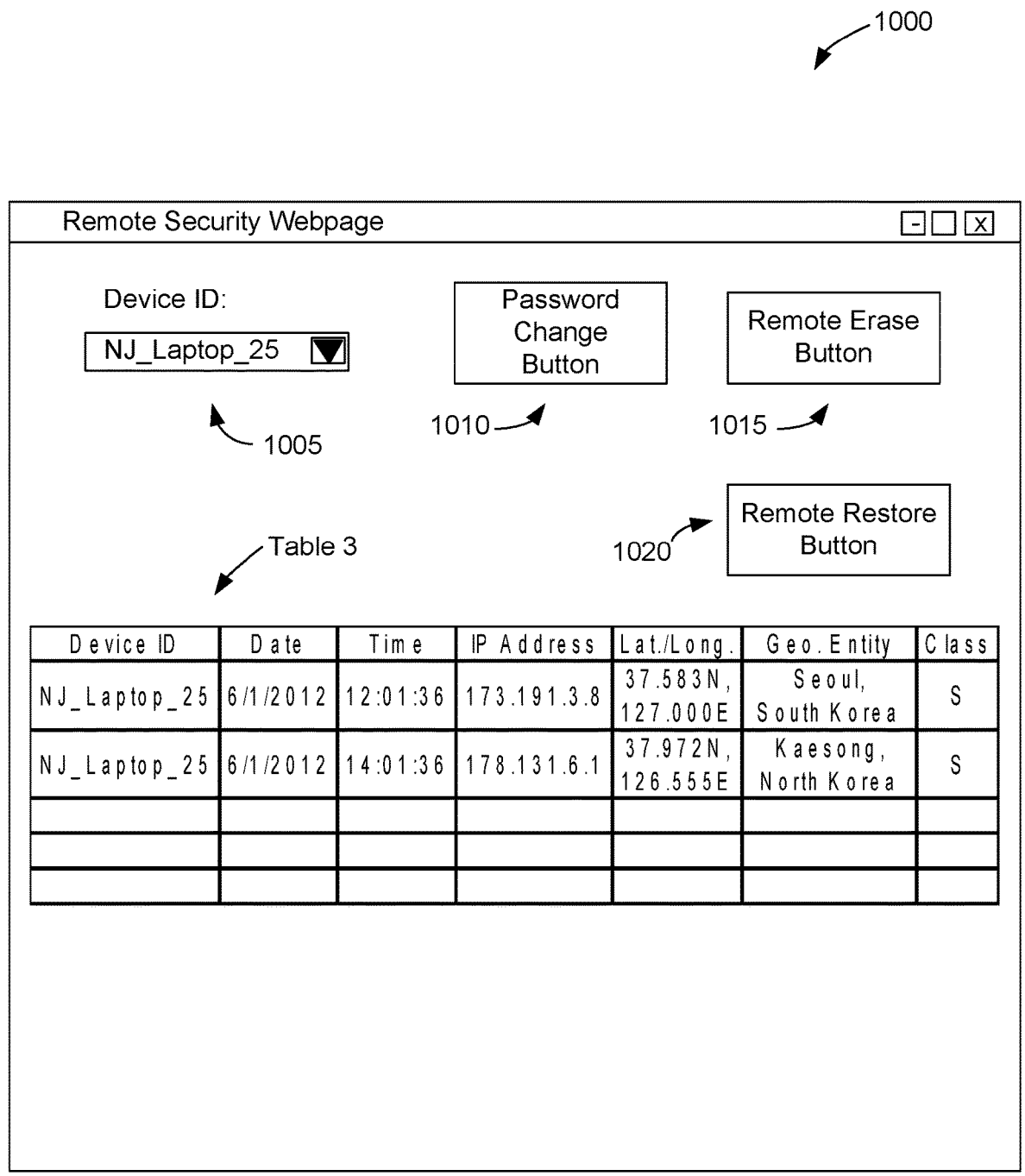
FIG. 10 is a diagram illustrating a webpage for providing remote data security services.

FIG. 10 illustrates an example of a webpage, or other GUI, that servers 545 may host to provide various security services related to computing device 205. Webpage 1000 may include a drop-down menu 1005, a change password button 1010, a remote erase button 1015, a remote restore button 1020, and the Table 3. Drop-down menu 1005 may enable a user of computing device 205 or an IT administrator to select the device ID of computing device 205. The change password button 1010 may enable a user to remotely change the password of computing device 205. The change password button may also be used to selectively password protect files/folders as noted above.

The remote erase button 1015 may enable a user to delete all production data from the computing device 205. In response to a user selecting the remote erase button 1015, servers 545 may install or launch an auto-executing program or function on computing device 205 that reformats or otherwise deletes the contents of one or more non-volatile storage devices of computing device 205, i.e., production storage media 218. Servers 545 may use other techniques to remotely remove production copies data from computing device 205. For example, servers 545 may communicate with a basic input output system (BIOS), or other remote management software/firmware on the computing device 205 that may be configured to provide remote memory management services for computing device 205.

In response to a user selecting the remote restore button 1020, severs 545 may transfer a most recent secondary copy of information, that was erased from the computing device 205, from non-production storage media to the computing device 205. The webpage 1000 may include a dialog box that enables a user to select a secondary copy from a number of secondary copies to restore to the computing device 205, according to the teachings of any one or more of FIGS. 1-9.

Webpage 1000 may display Table 3 to enable a user to review the locations at which computing device 205 has been or is being operated. For example, if a user has misplaced computing device 205 during his or her business travels, e.g., to Seoul, the user may use webpage 1000 to determine the last location at which computing device 205 was operated. If the user determines that computing device 205 is currently being operated or has recently been operated in a location that the user has not been to, e.g., North Korea, the user may decide to either change the password of the computing device 205 or use the remote erase button 1015 to delete the production copies of data stored on computing device 205. Advantageously, because the webpage 1000 logs the locations where the computing device 205 has been operated, webpage 1000 enables a user to retrace his or her steps to try to find the lost or misplaced computing device 205 before making the decision to remotely wipe the production data stored on computing device 205.

In some implementations, it may be advantageous for an IT administrator to use webpage 1000 to review the locations at which the computing device 205 has been or is being operated. Webpage 1000 enables IT administrators to, for example, change the password on the remote computing device 205 to block out the user, and enables the IT administrators to remotely the erase the production copies of data stored on computing device 205. For example, if an IT administrator determines that a user is operating the computing device 205 in a geographic entity or region where the computing device 205 is not supposed to be operated, e.g. outside of the United States or in North Korea, the IT administrator may use the remote erase button 1015 and remove all production copies of data from the computing device 205.

In some implementations, the remote erase button 1015 does not erase all data on computing device 205 but instead allows erasures of selected portions of production data on the computing device 205 (e.g. specific files/folders). The webpage 1000 may display a dialog box that enables the user to select classes of data, particular files or folders of data, data associated with a particular application, data that includes a particular alpha-numeric identifier, and/or data having a particular level of sensitivity, e.g., secret. Further details on data classification are described above.

In other implementations, the webpage 1000 enables a user to search through secondary copies of information that were copied from the computing device 205 to allow the user to review and identify particular files or data objects that should be remotely erased from the computing device 205. The webpage 1000 may also provide the option to encrypt or password protect selected information, via the remote erase button 1015, rather than just erasing all or part of the information on the computing device 205. Thus, the remote erase or wipe function may allow the computing device 205 to continue operating while a thief is tracked down, without exposing an organization's valued information to risk of theft because the valued information is selectively removed from the computing device 205.

Figure 11:
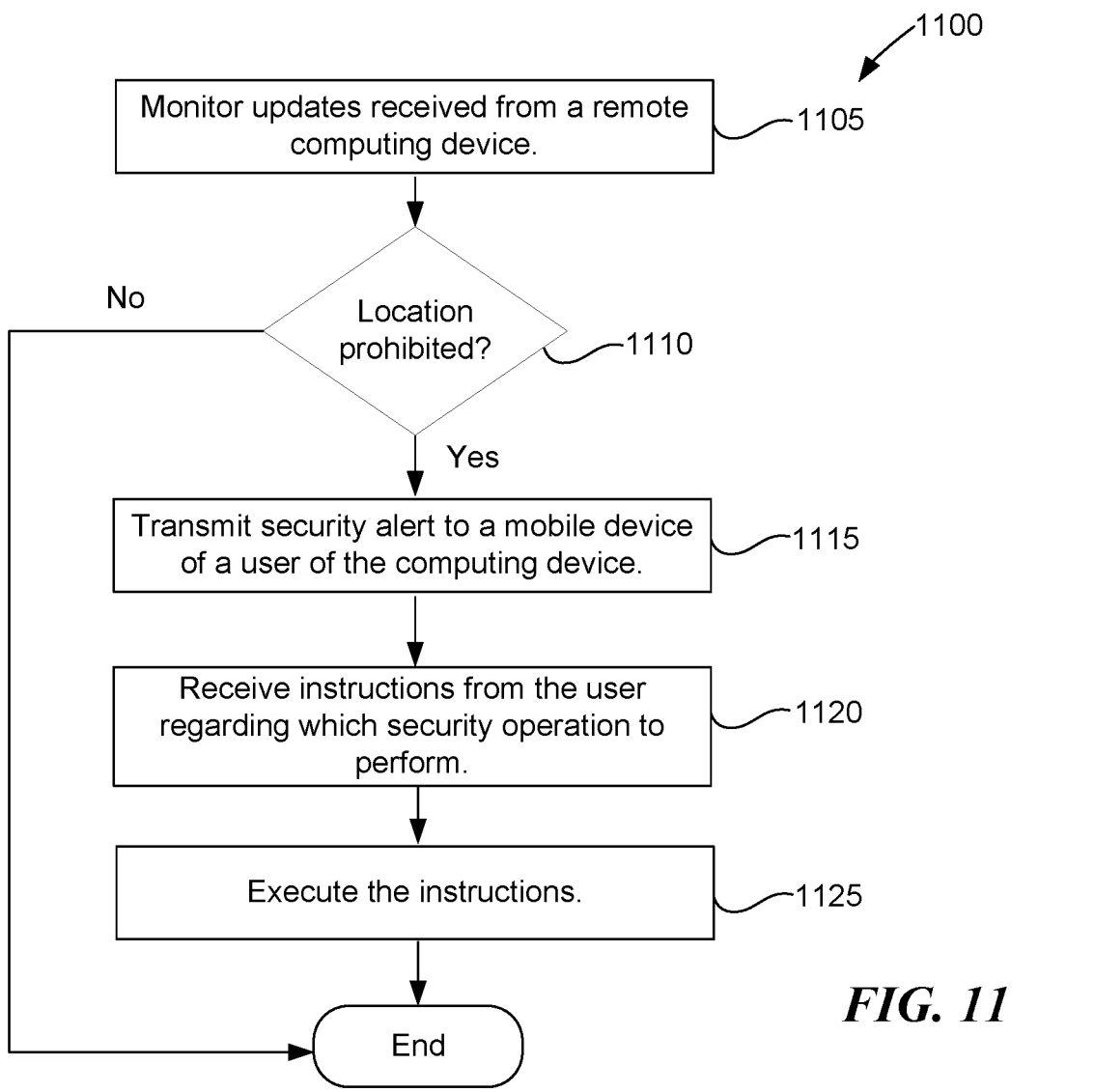
FIG. 11 illustrates an example of a method of remotely erasing selected portions of information from a computing device.

FIG. 11 illustrates a method 1100 of remotely erasing selected portions of information from a computing device.

Selective erasure of information enables the user to more quickly restore the system to its prior state if the computing device was simply misplaced, rather than stolen.

At block 1105, a server monitors updates received from a remote computing device. The server may be one of a number of devices within an information management cell. In some implementations, the server is a storage manager, and other implementations, the "server" is implemented as a media agent. The server may receive location information, network information, and security-based notifications. The remote computing device may generate location information and network information by using the methods or techniques that have been described above. The remote computing device may generate security-based notifications in response to a number of failed attempts, e.g., 3 attempts, at logging into the computing device by a user.

At block 1110, the server compares the location information received from the computing device to one or more data structures stored by the server. The data structures may include rules and may specify geographic entities or locations in which use of the computing device is prohibited. If the server receives security-based notifications from the computing device or if the server determines that the computing device is operating in a prohibited geographic entity based on the comparison, the process proceeds to block 1115.

At block 1115, the server transmits a security alert or notification to a mobile device of a user regarding the computing device. The server may transmit the security alert to a mobile device of the user. The server may transmit the security alert via email or by using one or more telecommunications protocols. For example, the server may transmit the security alert via SMS or MMS using, for example, one or more of various wireless carrier API, e.g., sendSms, getSmsDeliveryStatus, sendMessage, and getMessageDeliveryStatus functions provided by Verizon.

In the security alert, the server may include the reason for the security alert along with a link to a remote security webpage, such as webpage 1000. Referring briefly to Table 3, in the security alert the server may notify the user that the reason for the notification is that the computing device has been identified as being operated in an area that is prohibited by an access control list, such as the one found in Table 4. The link to the remote security webpage may be an HTML link or may alternatively be a link to a remote security application located on the user's mobile device.

At block 1120, the server receives instructions from the user regarding which security operation to perform on the computing device. The server may receive instructions from the user via one or more user interface objects displayed by a remote security webpage, such as webpage 1000. Through the remote security webpage the user, IT administrator or other person selects from one or more of a number of security options or instructions for the server to execute. For example, using the remote security webpage, the user may select to encrypt or password protect certain files, folders, files having a particular file extension, classes of information (e.g., financial information), or information having a particular sensitivity classification (e.g., secret).

As described above, server may enable the user to browse through the information stored on the computing device by allowing the user to browse through a reconstructed version of the file system of the computing device. The system may allow browsing via prior data classification to thereby automatically identify certain classes of data. The server may then restore the most recent version of the backup information onto a virtual computing device hosted by the server. Through the virtual computing device, the user browses and identifies portions of information located on the computing device for encryption, protection, or deletion from the computing device.

At block 1125, the server executes the instructions received and the process ends. An advantage of enabling the user to remotely and selectively encrypt, protect, or erase information on a computing device is that the information can be more easily recovered, in the event that the user later recovers the computing device.

In some implementations of the information management system, servers 545 are configured to use features included in webpage 1000 to automatically erase the production copies of data from the computing device 205 based on the geographic entity or region in which the computing device 205 is operated. For example, if computing device 205 contains sensitive, confidential, and/or secret corporate or government information, the servers 545 may be configured to remotely erase production copies of data, e.g., on primary storage medium 218, if the computing device 205 is operated within a particular geographic region, such as state 535B, or if the computing device 205 is operated outside of a particular geographic region, such as the second country 515. According to some implementations, the servers 535 may first provide a notification or warning to the user prior to locking the user out or remotely erasing all production copies of data. In other implementations, the servers 535 may be configured to notify a user of the erasure of production copies of data from computing device 205 after the production data has been erased to prevent the user from removing a power source from the computing device 205 in attempt to interfere with the remote erase operation. Thus, servers 535 may automatically provide security services based on the geographic entity or region in which computing device 205 is operated. That is, the servers 535 may enable one or more users to monitor and maintain security of production data stored on the computing device 205, e.g., via webpage 1000.

Figure 12:
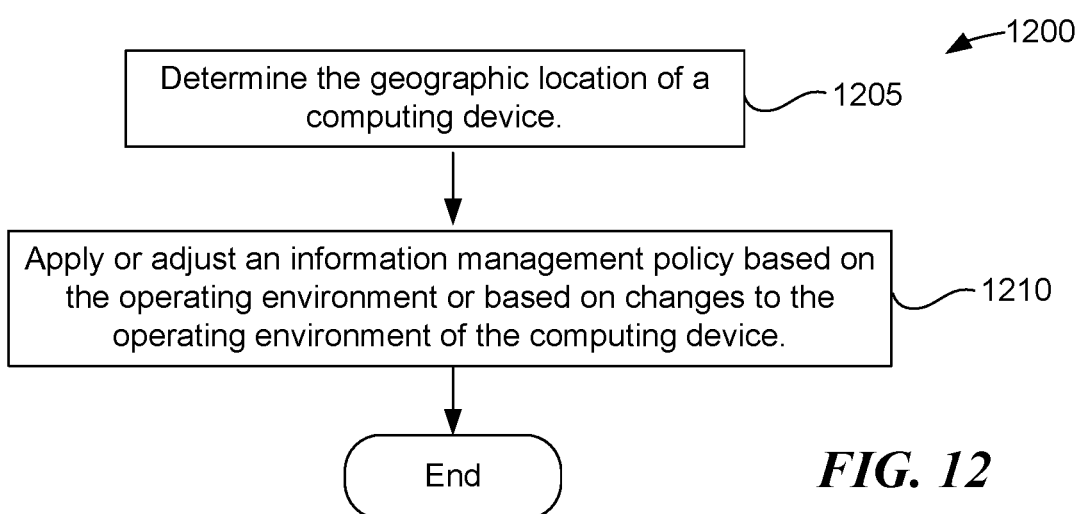
FIG. 12 illustrates an example of a method of performing information management operations on a computing device based on the geographic location of the computing device.

FIG. 12 illustrates a method 1200 of performing information management operations on a computing device based on the geographic location of the computing device. By performing operations based on the geographic location of the computing device, an information management server can adapt for changes in network quality, regulatory requirements, and device security.

At block 1205, the server determines the geographic location of the computing device and determines which geographic entity the computing device is operating within. The server may simply receive the geographic location from the computing device, or the server may determine the geographic location using GPS coordinates or network information received from the computing device.

At block 1210, the server implements or adjusts an information management policy in response to the operating environment or in response to changes in the operating environment of the computing device. The server may adjust the type of secondary copies created, the frequency of creating secondary copies, and the location where the secondary copies are stored, among other things. The server may also create an unscheduled secondary copy of production data, in response to a security threat, before deleting all or part of production data stored on the computing device. The server may transfer management responsibility for the computing device to another server that may be closer to the computing device or that may share a faster connection speed with the computing device. Other aspects may also be varied.

While the above description has been directed towards applications associated with computing devices that are mobile, any one or more of the disclosed methods, systems, or techniques may be applied to static devices, such as fixed servers, as well which may be movable. Thus, any one or more of methods 600-900 and 1100-1200 may be used to adjust the information management policy applied to a static computing device. For example, a storage manager having responsibility for an information cell that includes static computing devices located in, for example, Denmark and Italy, may adjust the storage or retention policies in response to updates to Danish or Italian data regulations. As another example, a storage manager, media agent, or other information management device may be configured to automatically apply a geographic entity-based information storage policy to new static computing devices, as the new static computing devices are added to the network of an organization. Some organizations, such as Starbucks Corporation, are growing fast and open new retail outlets daily, if not more frequently. Implementing the described systems and methods to manage quickly growing organizations would enable the organization to automatically apply the correct information management policy to newly installed devices by looking up the IP address of the new device to determine its location and by applying the location-based or geographic entity-based policy to the new static device.

Various techniques have been disclosed herein to provide geographic entity or region-based information management services. The geographic entity or region-based techniques may also be used to perform convenience-related services. For example, the geographic entity or region-based techniques disclosed herein may be used to automatically change the default printer for the computing device 205 or may be used to update a user's calendar with the time zone that the user is working from.

Each of the various services described herein may include settings menus that enable IT administrators to opt-in or opt-out of one or more of the location-based services. Additionally, each of the various services described herein may be packaged to provide limited feature sets to customers only interested in paying for the limited feature set, or a full feature set for customers who pay for all of the software features.

Conclusion

Systems and modules described herein may comprise software, firmware, hardware, or any combination(s) of software, firmware, or hardware suitable for the purposes described herein. Software and other modules may reside on servers, workstations, personal computers, computerized tablets, PDAs, smart phones, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

What is claimed is:

1. A method comprising:
   determining a geographic entity corresponding to a current location of a computing device;
   determining one or more information management rules of a plurality of information management rules to apply to the geographic entity,
      wherein the plurality of information management rules are based on data regulations associated with geographic entities;
   updating an information management policy to include criteria or the one or more information management rules based on the one or more information management rules,
      wherein the updating is initiated due to a change to the current location of the computing device or a change to the one or more information management rules,
      wherein the information management policy is a data structure that comprises a set of criteria and one or more information management rules associated with performing at least one information management operation on data assigned to the information management policy,
      wherein the information management policy comprises an information management rule or criteria for creating at least one secondary copy of data stored on the computing device, wherein the at least one secondary copy of the data is stored in a secondary storage location defined by the information management policy;
   applying the information management policy to the data stored on the computing device,
      wherein applying the information management policy includes modifying one or more of:
         a frequency with which secondary copies of the data stored on the computing device are made,
         a location to which the secondary copies of the data stored on the computing device are stored,
         a type of encryption to apply to the data stored on the computing device,
         a type of encryption to apply to the secondary copies of the data stored on the computing device,
         a password requirement,
         a type of secondary copy operation to be executed on the data stored on the computing device, and
         retention of the data stored on the computing device.

2. The method of claim 1, wherein determining the one or more information management rules of a plurality of information management rules to apply to the geographic entity includes extracting the at least one of the information management rules from documents published on a world wide web.

3. The method of claim 1, wherein the data of the computing device includes production copies of data generated by the computing device.

4. The method of claim 1, wherein the data stored on the computing device includes metadata and data, and
   wherein the metadata is associated with network communications performed by the computing device.

5. The method of claim 1, wherein determining the geographic entity includes:
   receiving, from the computing device, at least one of a network address of the computing device, GPS coordinates of the computing device, or a response from a query to a wireless telecommunications system.

6. The method of claim 1, wherein determining which information management rules apply to the geographic entity includes querying an access control list that identifies geographic entities into which operation of the computing device is prohibited by an organization.

7. The method of claim 1, further comprising modifying metadata of at least some of the data stored on the computing device without removing the data stored on the computing device.

8. The method of claim 1, further comprising:
   providing a user interface to receive instructions from a user,
      wherein the user interface includes one or more user objects to enable the user to instruct an information management server to perform a data operation.

9. The method of claim 1, wherein in response to determining that the location of the computing device is within the geographic entity, the method further comprising:
   receiving instructions from a user that identify at least part of the data stored on the computing device or specify a type of data to be adjusted or deleted.

10. The method of claim 1, wherein in response to determining that the location of the computing device is within the geographic entity:
  encrypting at least part of the data stored on the computing device,
  password protecting at least part of the data stored on the computing device, or
  deleting at least part of the data stored on the computing device.

11. A non-transitory computer-readable medium whose contents, when executed by a processor of a computing device, cause the computing device to perform a method, the method comprising:
  acquiring information associated with a geographic location of the computing device;
  transmitting the information associated with the geographic location of the computing device to an information management server, wherein the information management server modifies an information management policy associated with the computing device based on the geographic location of the computing device;
  wherein the modified information management policy comprises criteria or one or more information management rules based on the information associated with the geographic location of the computing device,
    wherein the information management policy is a data structure that comprises a set of criteria and one or more information management rules associated with performing at least one information management operation,
    wherein the information management policy comprises at least one information management rule or criteria for creating at least one secondary copy of data stored on the computing device, wherein the at least one secondary copy of the data is stored in a secondary storage location defined by the information management policy;
  receiving a request from the information management server for copies of data and metadata stored by the computing device; and
  transmitting the requested copies of the data and metadata to the information management server.

12. A system comprising:
  one or more computing devices, comprising one or more processors, wherein the one or more computing devices is configured to:
  determine a geographic entity corresponding, to a current location of a computing device;
  determine one or more information management rules of a plurality of information management rules to apply to the geographic entity, wherein the plurality of information management rules are based on data regulations associated with geographic entities; update an information management policy to include criteria or the one or more information management rules based on the determining of the one or more information management rules to apply to the geographic entity, wherein the updating is initiated due to a change to the current location of the computing device or a change to the one or more information management rules that apply to the geographic entity, wherein the information management policy is a data structure that comprises a set of criteria and one or more information management rules associated with performing at least one information management operation, wherein the information management policy comprises at least one information management rule or criteria for creating at least one secondary copy of data stored on the computing device, wherein the at least one secondary copy of the data is stored in a secondary storage location defined by the information management policy; and applying the information management policy to the data stored on the computing device, wherein applying the information management policy includes modifying one or more of: a frequency with which secondary copies of the data stored on the computing device are made, a location to which the secondary copies of the data stored on the computing device are stored, a type of encryption to apply to the data stored on the computing device, a type of encryption to apply to the secondary copies of the data stored on the computing device, a pass word requirement, a type of secondary copy operation to be executed on the data stored on the computing device, and retention of the data stored on the computing device.

13. The system of claim 12, configured to extract at least one of the information management rules from documents published on a world wide web.

14. The system of claim 12, wherein the data of the computing device includes production copies of data generated by the computing device.

15. The system of claim 12, wherein the data of the computing device includes metadata and data, and
  wherein the metadata includes information regarding network communications performed by the computing device.

16. The system of claim 12, further configured to:
  receive, from the computing device, at least one of:
    a network address of the computing device,
    GPS coordinates of the computing device, or
    a response from a query to a wireless telecommunications system.

17. The system of claim 12, further configured to query an access control list that identifies geographic entities into which operation of the computing device is prohibited by an organization.

18. The system of claim 12, further configured to modify metadata of at least some of the data stored on the computing device without removing the data.

19. The system of claim 12, further configured to:
  provide a user interface to receive instructions from a user,
    wherein the user interface includes one or more user objects to enable the user to instruct an information management server to perform a data operation.

20. The system of claim 12, wherein in response to determining that the location of the computing device is within the geographic entity, the system is further configured to:
  receiving instructions from a user that identify at least part of the data stored on the computing device or specify a type of data to be adjusted or deleted.

21. The system of claim 12, further configured to perform one or more operations of:
  encrypt at least part of the data stored on the computing device,
  password protect at least part of the data stored on the computing device, or
  delete at least part of the data stored on the computing device.

* * * * *